(12) United States Patent
Vikberg et al.

(10) Patent No.: US 8,953,803 B2
(45) Date of Patent: Feb. 10, 2015

(54) CIRCUIT SWITCHED MOBILE TELEPHONY IN FIXED WIRELESS ACCESS

(75) Inventors: Jari Vikberg, Järna (SE); Tomas Nylander, Värmdö (SE); Håkan Olofsson, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 419 days.

(21) Appl. No.: 13/191,987

(22) Filed: Jul. 27, 2011

(65) Prior Publication Data

US 2013/0028420 A1 Jan. 31, 2013

(51) Int. Cl.

| H04K 1/00 | (2006.01) |
|---|---|
| H04W 12/02 | (2009.01) |
| H04W 12/06 | (2009.01) |
| H04W 4/00 | (2009.01) |
| H04L 12/28 | (2006.01) |
| H04L 12/54 | (2013.01) |
| H04M 1/00 | (2006.01) |
| H04W 88/04 | (2009.01) |
| H04L 29/06 | (2006.01) |

(52) U.S. Cl.
CPC .............. *H04W 12/02* (2013.01); *H04W 12/06* (2013.01); *H04W 88/04* (2013.01); *H04L 63/164* (2013.01)
USPC ........... 380/270; 380/255; 370/328; 370/401; 455/558

(58) Field of Classification Search
USPC .................. 455/450, 436–438; 370/328, 338, 370/331–332, 465–466, 469; 726/1–26
See application file for complete search history.

(56) References Cited

U.S. PATENT DOCUMENTS

| 2002/0081992 | A1 | 6/2002 | Keller et al. |
| 2008/0076419 | A1* | 3/2008 | Khetawat et al. .......... 455/435.1 |
| 2008/0254833 | A1* | 10/2008 | Keevill et al. ................ 455/558 |
| 2009/0156213 | A1 | 6/2009 | Spinelli et al. |
| 2009/0264154 | A1 | 10/2009 | Rofougaran |
| 2011/0053569 | A1 | 3/2011 | Karaoguz et al. |

FOREIGN PATENT DOCUMENTS

WO 2007/015068 A1 2/2007

OTHER PUBLICATIONS

3GPP TS 24.008, 3rd Generation Partnership Project; Technical Specification Group Core Network and Terminals; Mobile Radio Interface Layer 3 Specification; Core Network Protocols; Stage 3 (Release 10), V10.1.0, Dec. 2010.
3GPP TS 23.401, General Packet Radio Service (GPRS) enhancements for Evolved Universal Terrestrial Radio Access Network (E-UTRAN) access, 3GPP Technical Specification, Mar. 2011, V10. 3.0.

(Continued)

*Primary Examiner* — Evans Desrosiers
(74) *Attorney, Agent, or Firm* — Nixon & Vanderhye, P.C.

(57) ABSTRACT

A fixed wireless terminal (29) comprises interfaces (32, 34) and a controller (40), e.g., a Generic Access Network Controller (GANC). The controller (40) is configured to interwork Generic Access Network (GAN) signaling employed between the mobile wireless terminal (29) and the fixed wireless terminal (30) with circuit switched signaling employed between the fixed wireless terminal and the radio access network (22). The interworking enables the controller (40) to provide a circuit switched mobile telephony core network service to the mobile wireless terminal (30).

40 Claims, 21 Drawing Sheets

(56) References Cited

OTHER PUBLICATIONS

3GPP TS 25.331, 3rd Generation Partnership Project; Technical Specification Group Radio Access Network; Radio Resource Control (RRC); Protocol Specification (Release 10), V10.3.1, (Apr. 2011).

3GPP TS 43.318, 3rd Generation Partnership Project; Technical Specification Group GSM/EDGE Radio Access Network; Generic Access Network (GAN); Stage 2 (Release 10), V10.1.0, (Mar. 2011).

3GPP TS 23.003, 3rd Generation Partnership Project; Technical Specification Group Core Network and Terminals; Numbering, Addressing and Identification (Release 10), Jun. 2011, V10.2.0.

3GPP TS 44.018, 3rd Generation Partnership Project; Technical Specification Group GSM/EDGE Radio Access Network; Mobile Radio Interface Layer 3 Specification; Radio Resource Control (RRC) Protocol (Release 10), V10.3.0, Jun. 2011.

3GPP TS 44.318, 3rd Generation Partnership Project; Techinical Specification Group GSM/EDGE Radio Access Network; Generic Access Network (GAN); Mobile GAN Interface Layer 3 Specification (Release 10); V10.0.0, (Dec. 2010).

Invitation to Pay Additional Fees and International Search Report mailed Dec. 6, 2012 in PCT application PCAT/SE2012/050818.

International Search Report mailed Mar. 11, 2013 in PCT application PCT/SE2012/050818.

Written Opinion mailed Mar. 11, 2013 in PCT application PCT/SE2012/050818.

Communication from European Patent Office dated Nov. 5, 2014 in European Patent Application No. 12 743 799.4 (5 pages).

* cited by examiner

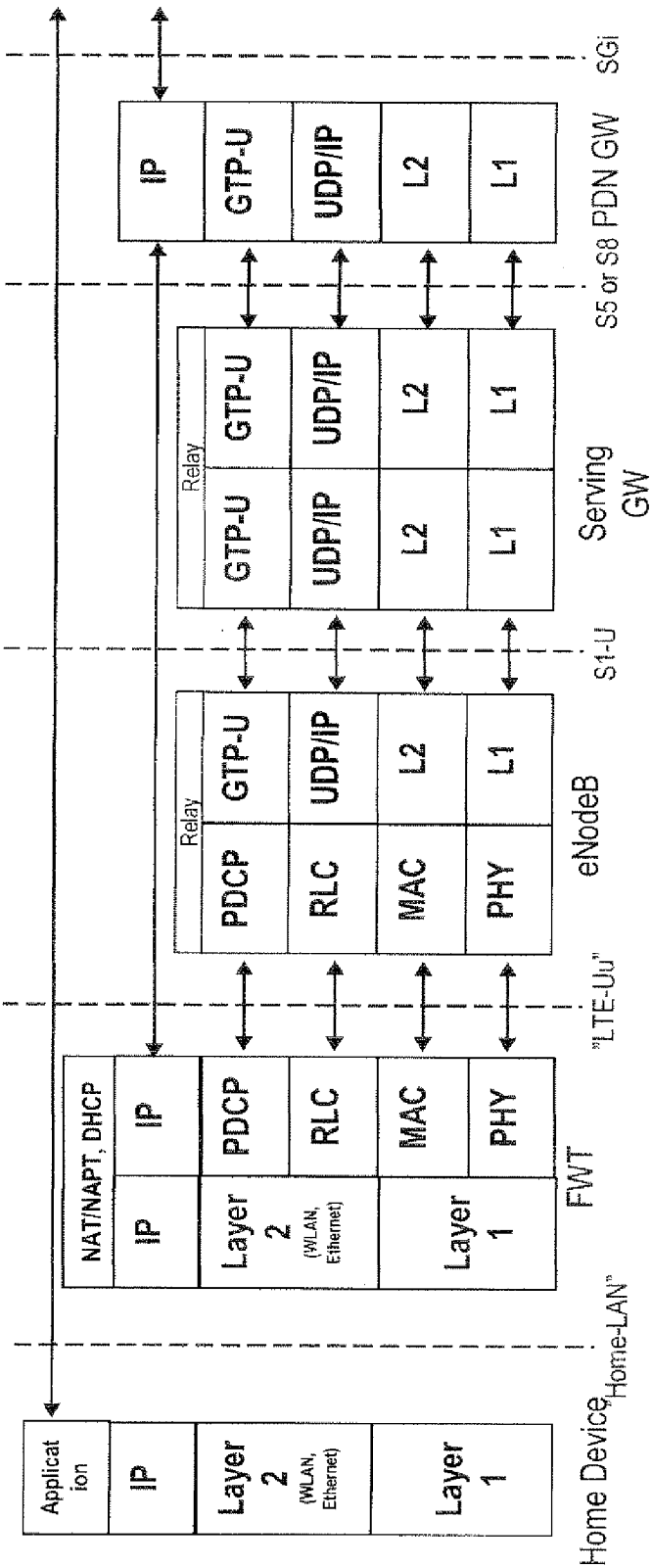

CIRCUIT SWITCHED MOBILE TELEPHONY IN FIXED WIRELESS ACCESS

TECHNICAL FIELD

This invention pertains to telecommunications, and particularly to provision of telephony services through fixed wireless access.

BACKGROUND

In a typical cellular radio system, wireless terminals, also known as mobile stations and/or user equipment units (UEs), communicate via a radio access network (RAN) to one or more core networks. The radio access network covers a geographical area which is divided into cell areas, with each cell area being served by a base station, e.g., a radio base station (RBS), which in some networks may also be called, for example, a "NodeB" (UMTS) or "eNodeB" (LTE). A cell is a geographical area where radio coverage is provided by the radio base station equipment at a base station site. Each cell is identified by an identity within the local radio area, which is broadcast in the cell. Another identity identifying the cell uniquely in the whole mobile network is also broadcasted in the cell. The base stations communicate over the air interface operating on radio frequencies with the user equipment units (UE) within range of the base stations.

In some versions of the radio access network, several base stations are typically connected, e.g., by landlines or microwave, to a controller node, such as a radio network controller (RNC) or a base station controller (BSC), which supervises and coordinates various activities of the plural base stations connected thereto. The radio network controllers are typically connected to one or more core networks.

The Universal Mobile Telecommunications System (UMTS) is a third generation mobile communication system, which evolved from the second generation (2G) Global System for Mobile Communications (GSM). The UMTS terrestrial radio access network (UTRAN) is essentially a radio access network using wideband code division multiple access for user equipment units (UEs). In a forum known as the Third Generation Partnership Project (3GPP), telecommunications suppliers propose and agree upon standards for third generation networks and UTRAN specifically, and investigate enhanced data rate and radio capacity. Specifications for the Evolved Packet System (EPS) have completed within the $3^{rd}$ Generation Partnership Project (3GPP) and this work continues in the coming 3GPP releases. The EPS comprises the Evolved Universal Terrestrial Radio Access Network (E-UTRAN), also known as the Long Term Evolution (LTE) radio access, and the Evolved Packet Core (EPC), also known as System Architecture Evolution (SAE) core network. E-UTRAN/LTE is a variant of a 3GPP radio access technology wherein the radio base station nodes are directly connected to the EPC core network rather than to radio network controller (RNC) nodes. In general, in E-UTRAN/LTE the functions of a radio network controller (RNC) node are distributed between the radio base stations nodes, e.g., eNodeBs in LTE, and the core network. As such, the radio access network (RAN) of an EPS system has an essentially "flat" architecture comprising radio base station nodes without reporting to radio network controller (RNC) nodes.

One type of wireless terminal is a fixed wireless terminal (FWT) which provides fixed wireless access to other communication units, typically in a localized area such as a home or office. Another name for the fixed wireless terminal is Mobile Broadband Router (MBR). Fixed wireless access serves, e.g., to provide an end user with fixed line services by utilizing a wireless technology, e.g., GSM, UMTS/high-speed packet access (HSPA)/wideband code division multiple access (WCDMA), SAE/LTE, code division multiple access (CDMA), or worldwide interoperability for microwave access (WiMAX) technologies. Fixed wireless terminals offer a cost efficient way to provide high speed data, voice and fax services to small office/home office and residential users. One non-limiting example of wireless technology providing the backhaul connection, as described below, is the SAE/LTE technology mentioned above. However, the concepts described herein apply equally well to other technologies, such as UMTS/HSPA/WCDMA and WiMAX, for example.

FIG. 1 shows various aspects of fixed wireless access (FWA) and an example fixed wireless terminal (FWT). The fixed wireless terminal device shown in FIG. 1 is, for example, located in an end user's home or office, and normally remains in the same location essentially all the time. That is, there is essentially no real mobility related to the fixed wireless terminal itself except for "nomadicity", e.g., the ability of the FWT to be powered off in one place, moved to another location, and then powered on again, and except for "vicarious portability", e.g., the fact that the FWT can be fixedly carried or installed in a moving object, such as a train, bus, or car, for example.

Typically a fixed wireless terminal such as that illustrated in FIG. 1 provides local connectivity and services for end user equipment located in the home or other location using, for example, wireless local area network (WLAN)/WiFi™ or Ethernet as the media. In addition, the fixed wireless terminal may provide support for multiple legacy services. For example, black phone, e.g., good old fixed phone, or fax may be connected to the fixed wireless terminal. The fixed wireless terminal is then directly connected to the mobile operator's radio access and core networks, and may, for example, provide access towards the Internet. FIG. 1 provides a description of a generic example of a fixed wireless terminal, and it should be understood that different variants of fixed wireless terminals may be connected to different mobile networks and thereby support different services. As used herein, a "mobile network" comprises a radio access network, which in turn may comprise a base station subsystem, and a core network, which may include a core circuit switched network and a packet switched core network.

FIG. 2A illustrates basics of "non-roaming architecture for 3GPP accesses" in a SAE/LTE case, and as such serves to illustrate how an example fixed wireless terminal may connect to a network. FIG. 2A is taken from FIG. 4.2.1-1 of 3GPP TS 23.401 V 10.3.0, which is incorporated herein by reference. FIG. 2A shows how a wireless terminal, e.g., UE or user equipment unit, is connected to the SAE/LTE network.

FIG. 2B illustrates one example of the UMTS/HSPA/WCDMA architecture with both UTRAN and core network (CN). FIG. 2B shows how a wireless terminal, e.g., UE or user equipment unit, is connected to UTRAN, and therefore FIG. 2B also shows how a fixed wireless terminal device is connected to the UMTS/HSPA/WCDMA network.

FIG. 3A shows how an example fixed wireless terminal is logically built to comprise a Home Gateway and a user equipment unit (UE) towards the SAE/LTE network, e.g., E-UTRAN network. The right side of the fixed wireless terminal of FIG. 3A is shown as a user equipment unit (UE) that uses the LTE-Uu interface towards the mobile operator's network. The fixed wireless terminal of FIG. 3A also comprises subscriber identity module (SIM) card or a universal subscriber identity module USIM card. The left side of the fixed wireless terminal of FIG. 3A is shown as a Home Gateway (GW) that provides a "Home or Residential Local Area Network (LAN)" for the devices in the Home or in the office at which the fixed wireless terminal is located.

FIG. 3B shows how an example fixed wireless terminal is logically built to comprise a Home Gateway and a user equipment unit (UE) towards the UMTS network, e.g., towards UTRAN network. The right side of the fixed wireless terminal of FIG. 3B is shown as a user equipment unit (UE) that uses the Uu interface towards the mobile operator's network. The fixed wireless terminal of FIG. 3B also comprises a SIM card or a USIM card. The left side of the fixed wireless terminal of FIG. 3B is shown as a Home Gateway (GW) that provides a "Home or Residential LAN" for the devices in the home or in the office at which the fixed wireless terminal is located.

FIG. 4 illustrates protocol architecture showing how an example fixed wireless terminal connects to the SAE/LTE network and how the other Home Devices are connected to the fixed wireless terminal. For the LTE/SAE network, only the user plane protocols stacks are used when the other Home Devices are using the connectivity provided by the fixed wireless terminal.

The fixed wireless terminal provides a "Home or Residential LAN" for the devices in the Home or in the office. For example, FIG. 1 shows a personal computer (PC) that uses WLAN to attach to the Home LAN and to connect to the services provided by the other devices connected to the Home LAN. For example, the Network Attached Storage (NAS) can contain different content like movies, music, pictures that the end user wants to access.

In the future it is more likely that primarily wireless access technologies, rather than wired technologies like Ethernet, will be employed in the Home LAN, e.g., between the fixed wireless terminal and the Home Devices. For example, WLAN, e.g., the different variants of WiFi 802.11, will likely become even more important in the future. The current estimates show that WLAN/WiFi will likely become a commodity in mobile terminals. For example, some market estimates predict that 100% all of 3G/WCDMA mobile terminals shipped in the 2011 timeframe will include WLAN/WiFi technology. Therefore it may be assumed that fixed wireless terminal devices will be able to provide Packet Switched (PS) services for mobile terminals.

However, none of the currently known fixed wireless terminal solutions or products provide the mobile terminals the possibility to use the fixed wireless terminal device and the Home LAN for mobile telephony. There is no way for the terminal to access the mobile telephony services provided by the existing Circuit Switched (CS) Core Network (CN), e.g., no way to access the services provided by the MSC and other CS CN nodes. Non-limiting examples of CS-based mobile telephony core network (CN) services that a UE may want to access include, for example, circuit-switched Short Message Services (SMS) and circuit-switched voice calls. This is a very severe limitation for the fixed wireless terminal solutions, particularly since the existing circuit switched core network services will remain and be used for a very long time in the mobile networks while the introduction of Voice-Over-PS domain services, like Internet protocol (IP) multimedia subsystem (IMS), is still waiting to happen. Therefore, providing CS-domain based mobile telephony services as an integrated part of the fixed wireless terminal solutions is important for end users, mobile operators, and vendors. The capability of handling CS-domain based mobile telephony services may very well become a very important factor for the success of the FWT solutions.

Various ways of handling CS-domain based mobile telephony services in a fixed wireless terminal context have been contemplated. One way is for the user equipment unit (UE) to use IMS/session initiation protocol (SIP) signalling towards the FWT and the FWT interworks the IMS/SIP-signalling towards CS-based mobile telephony service, e.g., towards signalling specified in 3GPP TS 24.008. But using IMS/SIP-signalling has the major disadvantage that the services provided to the user equipment unit (UE) when in the IMS/SIP domain, e.g., connected via the FWT, would be different from the services provided from the 3GPP CS domain. Any service interworking between an IMS/SIP-domain and the 3GPP CS domain is known to be extremely difficult to support in a transparent way.

Another contemplated way to handle CS-domain based mobile telephony services in a fixed wireless terminal context involves usage of the 3GPP macro network for circuit switched access and FWT for data access. In this contemplated way the user equipment unit (UE) with both circuit switched and packet switched (PS) services would be connected like a Smartphone to both the 3GPP macro network for circuit switched service and to the FWT for PS/data service. This way has several draw backs. For example, indoor voice coverage is known to be poor, especially on high frequency bands, and indoor coverage is not significantly improved, if at all, with this contemplated way of handling CS-domain based mobile telephony services. Moreover, the user equipment unit (UE) would be simultaneously connected to both the 3GPP Macro network and to the local FWT network. This has severe impact on the UE battery lifetime.

SUMMARY

In one of its aspects the technology disclosed herein concerns a fixed wireless terminal. In an example embodiment the fixed wireless terminal comprises a first interface configured to enable radio communication with a mobile network; a second interface configured to enable radio communication with a mobile wireless terminal; and a controller. The controller is configured to interwork signaling according to an adaption layer protocol employed between the mobile wireless terminal and the fixed wireless terminal with circuit switched signaling employed between the fixed wireless terminal and the mobile network to provide circuit switched mobile telephony core network service to the mobile wireless terminal. In an example embodiment, the adaption layer protocol is a Generic Access Network (GAN) protocol and the controller is configured to perform the circuit switched signaling according to a UMTS terrestrial radio access network (UTRAN) or GSM EDGE Radio Access Network (GERAN) protocol and to interwork the Generic Access Network (GAN) protocol and the UTRAN or GERAN protocol.

In an example embodiment the controller is configured to use system information broadcasted in the mobile network to construct GAN-specific system information.

In an example embodiment the fixed wireless terminal is configured to transparently forward authentication signalling between the mobile wireless terminal and the mobile network. Upon receiving mobile network encrypted information from the mobile network, the fixed wireless terminal is further configured to add Internet Protocol security (IPsec) encryption to the mobile network encrypted information and to forward the mobile network and IPsec encrypted information towards the mobile wireless terminal in an IPsec tunnel. Further, upon receiving mobile network and IPsec encrypted information from the mobile wireless terminal, the fixed wireless terminal is configured to remove the IPsec encryption from the mobile network and IPsec encrypted information and to forward the mobile network encrypted information towards the mobile network.

In another example embodiment the fixed wireless terminal is configured to indicate to the mobile network that authentication of the fixed wireless terminal and authentication of the mobile wireless terminal are associated together and to transparently forward authentication signalling between the mobile wireless terminal and the mobile network. Further, the fixed wireless terminal is configured to receive information from the mobile wireless terminal in an IPsec tunnel between the mobile wireless terminal and the fixed wireless terminal and to encrypt the information received from the mobile wireless terminal using ciphering keys resulting from authentication of the fixed wireless terminal and then to forward the encrypted information towards the mobile network. The fixed wireless terminal is further configured to decrypt information received from the mobile network using the ciphering keys resulting from authentication of the fixed wireless terminal, and then to forward the decrypted information towards the mobile wireless terminal using the IPsec tunnel.

In an example embodiment and mode the fixed wireless terminal is configured to perform a mobile wireless terminal authentication operation in which the fixed wireless terminal determines whether the mobile wireless terminal is allowed to establish an Internet Protocol security (IPsec) connection with the fixed wireless terminal.

In an example embodiment and mode the fixed wireless terminal is configured to perform encryption of communications between the mobile wireless terminal and the fixed wireless terminal based on Internet Protocol security (IPsec) as a result of the mobile wireless terminal authentication operation.

In an example embodiment, the fixed wireless terminal is configured to create a separate packet data protocol (PDP) context or public data network (PDN) connection for use in communicating with an authentication/authorization/accounting (AAA) server in the mobile network.

In an example embodiment and mode the fixed wireless terminal is configured to indicate, as part of an attachment or PDP context or PDN connection creation, that a device type of the fixed wireless terminal is fixed wireless terminal.

In an example embodiment the fixed wireless terminal is configured to participate in a wireless terminal authentication operation. In an example embodiment and mode the wireless terminal authentication operation is configured to enable the fixed wireless terminal to respond to an authentication request from a node of a core network by generating an authentication response and a ciphering key that is operative over the radio interface between the fixed wireless terminal and the mobile network; and to cause all transactions created by the fixed wireless terminal to be charged to a subscription used for the wireless terminal authentication operation.

In an example embodiment the controller is realized by electronic circuitry.

In another of its aspects the technology disclosed herein concerns a communications system. The communications system comprises a mobile network through which a circuit switched mobile telephony core network service is provided over a radio interface and a fixed wireless terminal. The fixed wireless terminal is configured to communicate over the radio interface with the mobile network and to provide the circuit switched mobile telephony core network service to a mobile wireless terminal.

In an example embodiment, the fixed wireless terminal comprises a controller configured to interwork signaling according to an adaption layer protocol employed between the mobile wireless terminal and the fixed wireless terminal with circuit switched signaling employed between the fixed wireless terminal and the mobile network. In an example embodiment the adaption layer protocol is a Generic Access Network (GAN) protocol.

In another of its aspects the technology disclosed herein concerns a method of operating a communications system to provide circuit switched mobile telephony core network service to a mobile wireless terminal. The method comprises employing signaling according to an adaption layer protocol between the mobile wireless terminal and a fixed wireless terminal; using circuit switched signaling between the fixed wireless terminal and a mobile network; and, interworking the signaling according to the adaption layer protocol and the circuit switched signaling at the fixed wireless terminal.

In an example embodiment and mode, the method further comprises initiating a wireless terminal authentication operation in which the fixed wireless terminal creates a separate PDP context or PDN connection for use in communicating with an authentication/authorization/accounting (AAA) server.

In an example embodiment and mode, the method further comprises the mobile network permitting a wireless terminal to make connectivity to an authentication/authorization/accounting (AAA) server only if a device type of the wireless terminal is fixed wireless terminal.

In various example embodiments and modes the method further comprises performing an authentication operation. In one such example embodiment and mode, the method further comprises authenticating both the mobile wireless terminal and the fixed wireless terminal; combining authentication and ciphering contexts for the mobile wireless terminal and the fixed wireless terminal; encrypting traffic between the mobile network and the fixed wireless terminal based on the authentication of the fixed wireless terminal; encrypting traffic between the fixed wireless terminal and the mobile wireless terminal using an underlying IPsec tunnel; and, associating a traffic-related event involving the mobile wireless terminal to a subscription for the mobile wireless terminal.

In an example embodiment and mode, the method further comprises a core network maintaining a subscription for the fixed wireless terminal, the subscription including subscription information that indicates subscription for fixed wireless terminal; and the mobile network using the subscription information for determining whether the device type of a wireless terminal seeking connectivity to the AAA server is fixed wireless terminal and permitting connectivity on the basis of the subscription information.

In an example embodiment and mode, the method further comprises the fixed wireless terminal indicating in an attachment operation or a PDP context creation operation or a PDN connection creation operation that the device type of the fixed wireless terminal is fixed wireless terminal; upon detecting that the device type indicated in the attachment operation or the PDP context creation operation or the PDN connection creation operation is fixed wireless terminal, the core network updating the subscription for the fixed wireless terminal to include subscription information that indicates subscription for fixed wireless terminal.

In another of its aspects the technology disclosed herein concerns a method of operating a communications system. The method comprises: permitting a wireless terminal to make connectivity to an authentication/authorization/accounting (AAA) server only if the wireless terminal is a fixed wireless terminal; and, using the fixed wireless terminal to provide circuit switched mobile telephony core network service to a mobile wireless terminal.

In an example embodiment and mode, the method further comprises using subscription information for the wireless terminal to ascertain whether the wireless terminal is fixed wireless terminal.

In another of its aspects the technology disclosed herein concerns a mobile wireless terminal. In an example embodiment the mobile wireless terminal comprises an antenna which enables communication with a mobile network over a wireless link; and a client configured to participate in signaling according to an adaption layer protocol with a fixed wireless terminal to obtain a circuit switched mobile telephony core network service.

In an example embodiment the adaption layer protocol is a Generic Access Network (GAN) protocol and the client is a Generic Access Network (GAN) client, and the client is realized by electronic circuitry.

In an example embodiment the mobile wireless terminal is configured to obtain authentication with an authentication/authorization/accounting (AAA) server of the mobile network.

In an example embodiment the mobile wireless terminal is configured to encrypt information to be transmitted to the mobile network via the fixed wireless terminal and to decrypt information received from the mobile network via the fixed wireless terminal using ciphering keys resulting from the authentication of the mobile wireless terminal with the mobile network.

In an example embodiment the mobile wireless terminal is further configured to perform encryption of communications between the mobile wireless terminal and the fixed wireless terminal based on Internet Protocol security (IPsec)

In an example embodiment the mobile wireless terminal is configured to seek an appropriate controller or gateway to enable authentication. In an example implementation, the mobile wireless terminal is configured to construct at least one fully qualified domain name to use in querying a domain name server (DNS) to obtain an address of the appropriate controller or gateway. In an example implementation, the mobile wireless terminal is configured to obtain an indication of the appropriate controller or gateway from a local area network access point. In an example implementation, the mobile wireless terminal is configured to obtain an indication of the appropriate controller or gateway from a provisioning and/or default gateway.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 4 is a diagrammatic view illustrating protocol architecture for connecting an example fixed wireless terminal to the SAE/LTE network and further illustrating how the other Home Devices are connected to the fixed wireless terminal.

DETAILED DESCRIPTION

Figure 1:
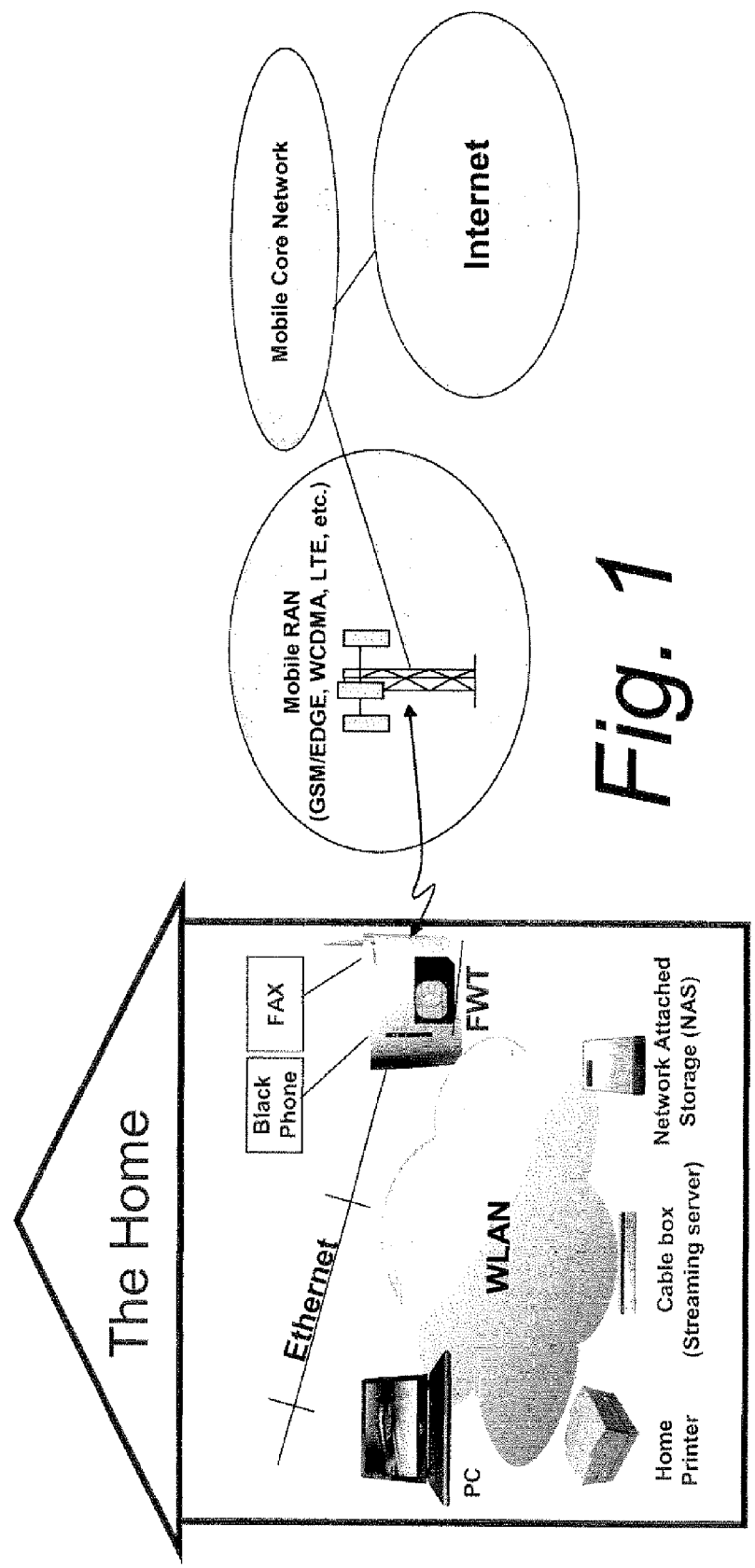
FIG. 1 is a diagrammatic view of a fixed wireless access (FWA) system.
Figure 2A:
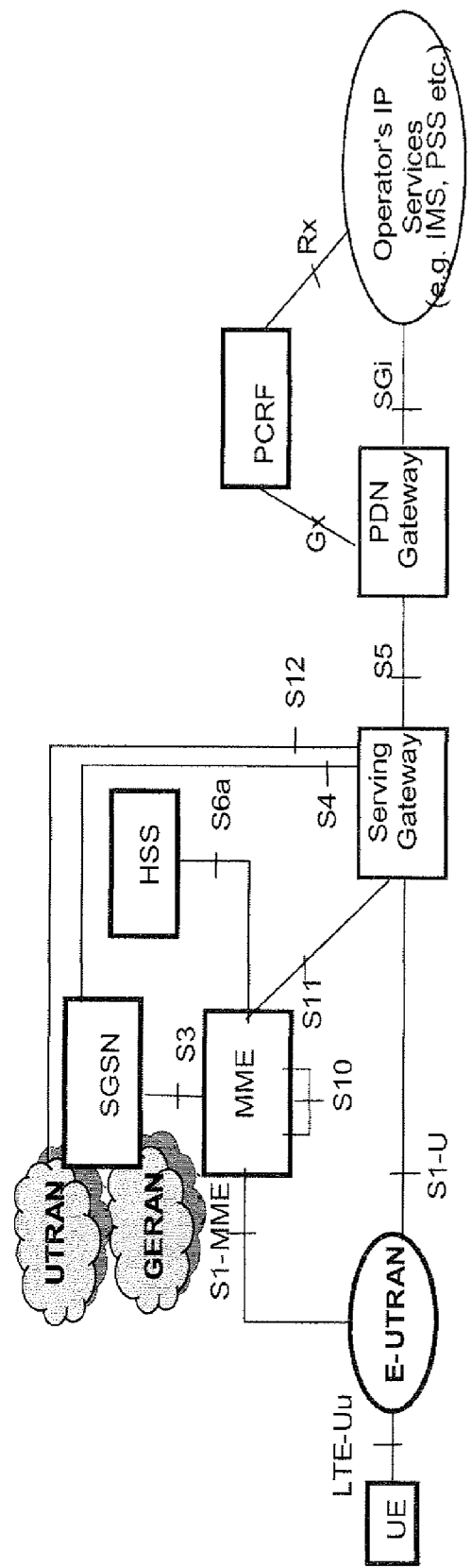
FIG. 2A is a diagrammatic view illustrating non-roaming architecture for 3GPP accesses in a SAE/LTE case.
Figure 2B:
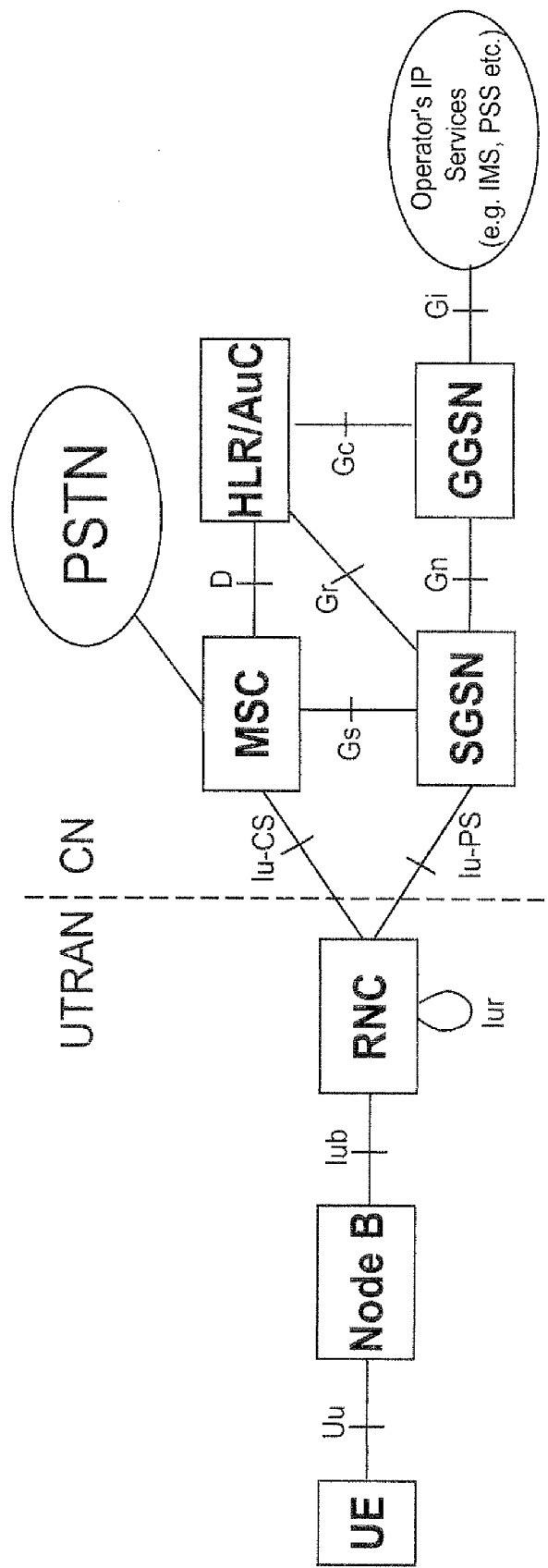
FIG. 2B is a diagrammatic view illustrating one example of the UMTS/HSPA/WCDMA architecture with both UTRAN and core network (CN).

In the following description, for purposes of explanation and not limitation, specific details are set forth such as particular architectures, interfaces, techniques, etc. in order to provide a thorough understanding of the present disclosure. However, it will be apparent to those skilled in the art that the present disclosure may be practiced in other embodiments that depart from these specific details. That is, those skilled in the art will be able to devise various arrangements which, although not explicitly described or shown herein, embody the principles of the present disclosure and are included within its spirit and scope. In some instances, detailed descriptions of well-known devices, circuits, and methods are omitted so as not to obscure the description of the present embodiments with unnecessary detail. All statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being hardware-implemented and/or computer-implemented, and thus machine-implemented.

In terms of hardware implementation, the functional blocks may include or encompass, without limitation, digital signal processor (DSP) hardware, reduced instruction set processor, hardware, e.g., digital or analog, circuitry including but not limited to application specific integrated circuit(s) (ASIC), and, where appropriate, state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

1.0 Overview

In one of its aspects the technology disclosed herein concerns provision of circuit switched mobile telephony core network services through fixed wireless access. In particular, the technology disclosed herein relates to methods and procedures to allow mobile terminals to access and use Circuit Switched (CS) based mobile telephony Core Network (CN) services as provided through or using Fixed Wireless Terminal/Mobile Broadband Router (FWT) solutions while being located or situated, for example, in a Home or office. It should be appreciated that the Fixed Wireless Terminal, hereinafter also referenced as the "FWT", may refer to devices or products which have a different name, such as "Mobile Broadband Router", abbreviated as "MBR". Moreover, parts of the Fixed Wireless Terminal/Mobile Broadband Router (FWT) may also herein and elsewhere be referred to as a Fixed Wireless Terminal-UE (FWT-UE). In particular, parts of the FWT working towards the mobile network, as opposed to the home gateway part of the FWT, perform or behave to some degree as does a user equipment unit (UE) to a mobile network. A client is provided in the mobile terminal, e.g., mobile UE, and usage of an adaption layer protocol occurs over the Home/Enterprise LAN, e.g., WLAN/WiFi, between the mobile terminal and the FWT device. The FWT contains functionality to interwork the signaling according to the adaption layer protocol to the mobile CS signaling towards the mobile Radio Access Network (RAN) and CN. As used herein, "interwork" or "interworking of signaling" includes any operation or technique whereby a first type of signaling, e.g., employed by a first protocol or network, is converted or otherwise rendered comprehensible/usable, by a second type of signaling, e.g., employed by or belonging to a second protocol or network.

In an example embodiment and mode, the adaption layer protocol is a Generic Access Network (GAN) protocol. Thus the term "adaption layer protocol" is employed in non-limiting fashion to include not only Generic Access Network (GAN) protocol, but any equivalent or comparable protocol which may exist either currently or in the future.

Figure 5A:
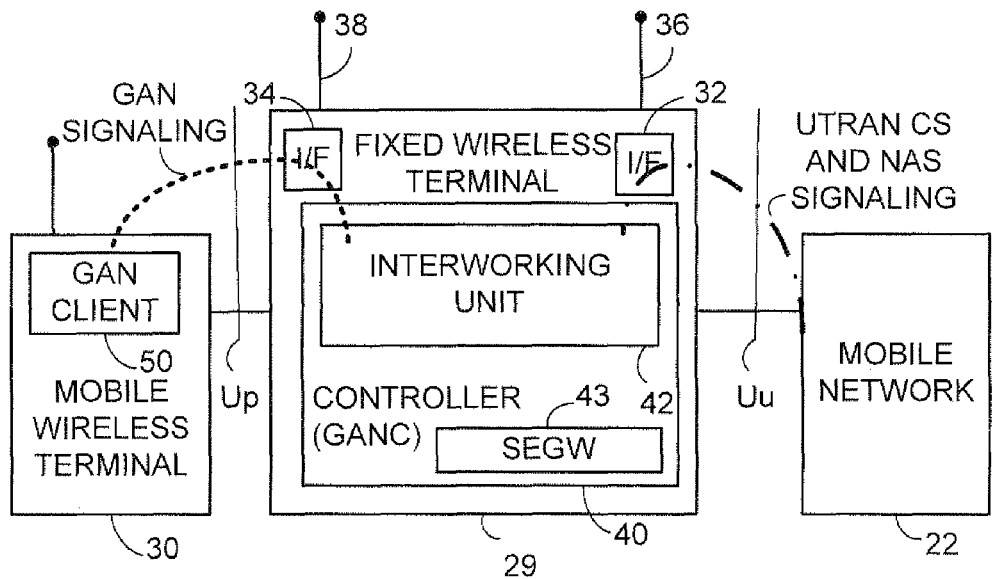
FIG. 5A is a schematic view of a communications network comprising a mobile network; an example fixed wireless terminal; and a mobile wireless terminal.

FIG. 5A illustrates a communications system comprising mobile network, e.g., mobile network 22; example fixed wireless terminal 29; and mobile wireless terminal 30, e.g., mobile station (MS) or user equipment unit (UE). In an example embodiment, fixed wireless terminal 29 comprises radio interfaces 32 and 34 and a controller 40. Radio interface 32, connected to one or more antenna 36, enables communication over the Uu interface and thus may communicate using technology such as that provided by 3GPP. Interface 34, connected to antenna 38, enables communication over the Up interface and thus may communicate using technology such as WLAN/WiFi. An interface which "enables" communication comprises means or structure which either or both (1) prepares and/or transmits information in a radio frequency signal over an air interface, (2) processes and/or receives a radio frequency signal transmitted over an air interface.

1.1 Overview of the Controller

The controller 40 is configured to interwork the signaling according to the adaption layer protocol employed between the mobile wireless terminal 30 and the fixed wireless terminal 29 with circuit switched signaling employed between the fixed wireless terminal 29 and the mobile network 22. As mentioned above, the adaption layer protocol may be Generic Access Network (GAN) protocol, for which reason controller 40 may be, and usually is, referred to herein as a Generic Access Network Controller (GANC). To this end, fixed wireless terminal 29 includes interworking unit 42. The fixed wireless terminal 29 may also include a Security Gateway (SEGW) 43, having a purpose described hereinafter. In FIG. 5A the adaption layer protocol, e.g., Generic Access Network (GAN), signaling is represented by a dashed line, while the circuit switched signaling, such as UTRAN CS and/or NAS signaling employed between the fixed wireless terminal 29 and the mobile network 22, is represented by a dotted-dashed line. For example, the UTRAN CS signalling is UTRAN RRC signalling and procedures. As explained herein, the interworking performed, e.g., by interworking unit 42, enables controller 40 to provide a circuit switched mobile telephony core network service to the mobile wireless terminal.

Figure 6:
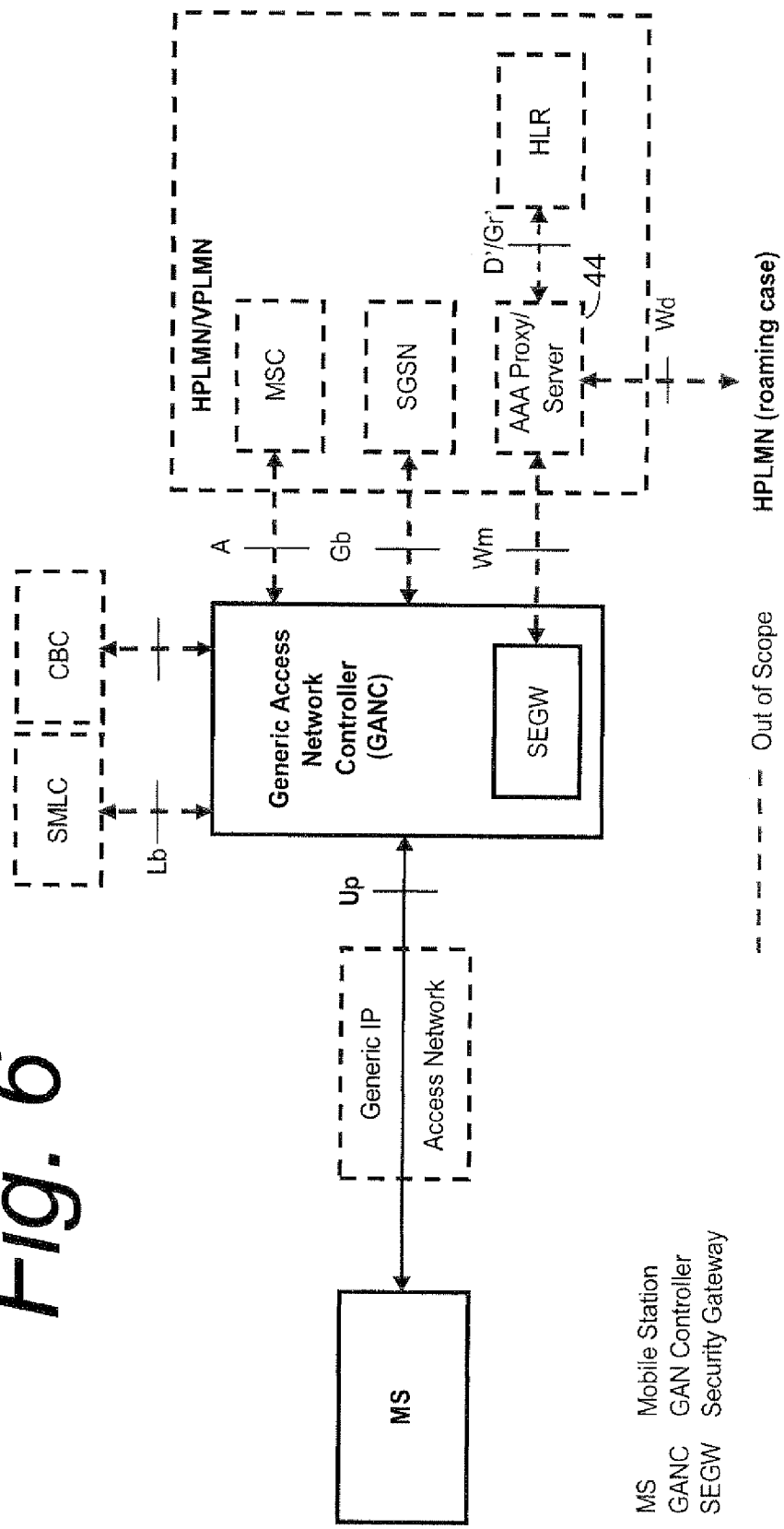
FIG. 6 is a diagrammatic view illustrating functional architecture of the Generic Access Network (GAN).

The controller 40 is located in the fixed wireless terminal 29, and as such differs from the Generic Access Network (GAN) nodes which have been standardized starting from 3GPP Release-6, an example of which is illustrated in FIG. 6. The prior art Generic Access Network (GAN) nodes communicate, e.g., over A and Gb interfaces, for which reason the prior art Generic Access Network (GAN) involves the nomenclature "Generic Access to A/Gb Interfaces" and has standardization which has been based on the Unlicensed Mobile Access (UMA) de-facto specifications. In the Radio Access Network (RAN) the prior art GAN technology included a node corresponding to GERAN BSC and which was also called Generic Access Network Controller (GANC). In prior art GAN solutions, the purpose is to use fixed access networks such as digital subscriber line (DSL) between the cellular network edge, e.g., the GANC, and e.g. the WiFi access point. In contrast, in the technology described herein, the cellular network is used as backhaul link all the way to the WiFi access point, i.e., the fixed wireless terminal, and the GANC is placed also in the fixed wireless terminal. A purpose of the technology described herein is to provide interworking and adaption protocol functions to carry the GAN CS signalling and traffic over the local WiFi hop and interwork these towards the CS and NAS signalling used in the mobile network.

The prior art GAN technology is specified in the 3GPP TS 43.318 and TS 44.318, both of which are incorporated herein by reference. FIG. 6, taken from 3GPP TS 43.318, shows functional architecture of the Generic Access Network (GAN) as structured for the prior art technology. A principle of the prior art implementation of the Generic Access Network (GAN) technology is that the mobile station (MS) is a dual-mode, dual radio handset including for example both WiFi and 3GPP-macro radio support, GSM, WCDMA or both. As such, the mobile station (MS) connects to a WiFi Access point (AP), not shown in FIG. 6, using the WiFi Radio. The prior art GAN standard defines, for example, how the mobile station (MS) can function in GAN mode and access the services provided by the GSM Core Network (CN) using the Up-interface between the mobile station (MS) and the GANC.

The initial prior art GAN standard may be called "2G-GAN" or "GSM-GAN", as the standard GSM interfaces, A and Gb are used between the GANC and the CN. In addition, a "3G-GAN" or "WCDMA-GAN" solution has been standardized that uses the standard WCDMA interfaces, for example the Iu-cs and the Iu-ps interfaces to connect to the Core Network (CN). Such resulting standard can be also called "Generic Access to Iu Interface", or (in short) "GAN-Iu".

Figure 7:
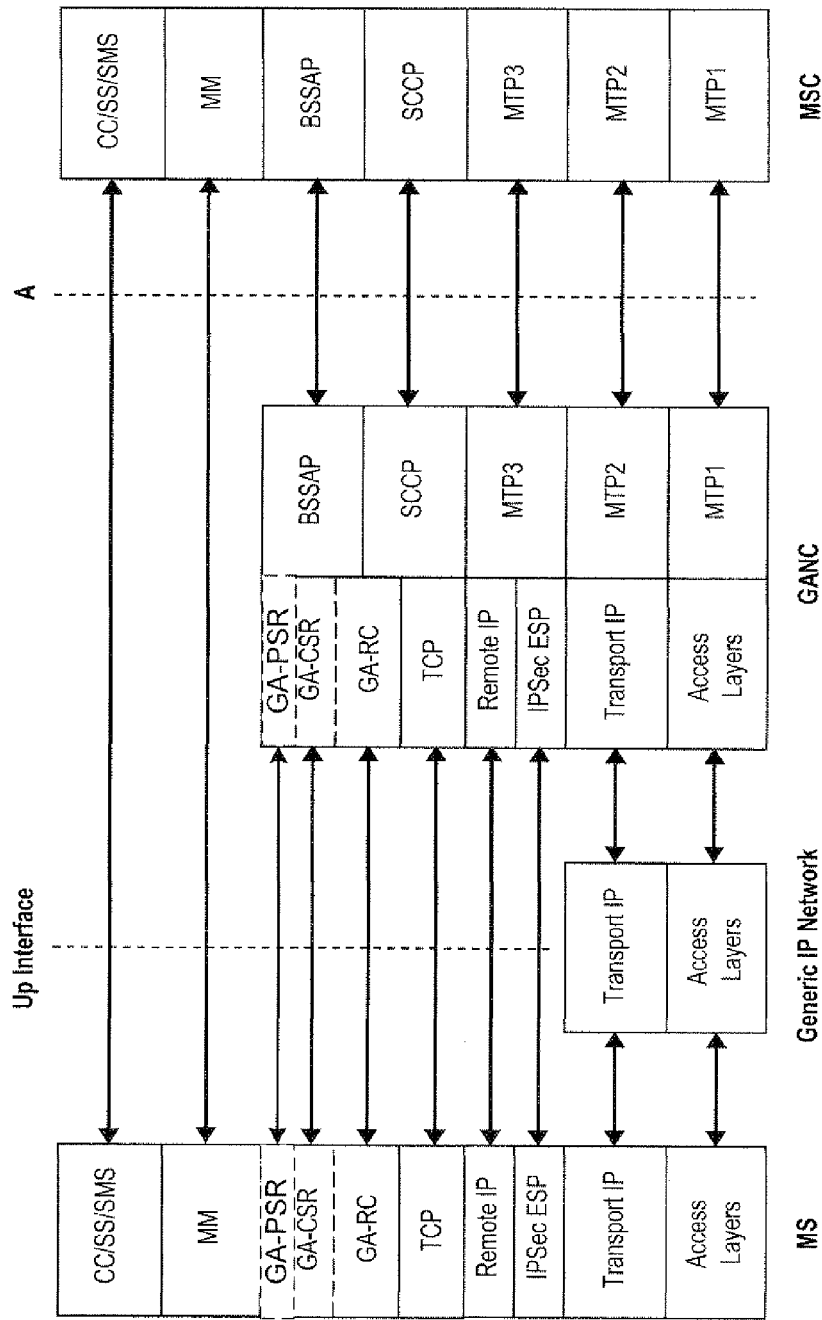
FIG. 7 is a diagrammatic view illustrating circuit switched (CS) Domain Control Plane Architecture related to Generic Access Network (GAN) and the Up-interface.

FIG. 7 shows the CS Domain Control Plane Architecture related to GAN and the Up-interface. When employed in a GSM type radio access network the GANC may use the normal A-interface signaling towards the MSC and may interwork the related protocol, like base station system application part (BSSAP), towards the relevant GAN-protocols, like Generic Access, Circuit Switched Resources (GA-CSR), in both directions, as understood with reference to the signaling, etc., illustrated FIG. 7. In differing radio access networks the controller 40 may interwork signaling in other ways.

Thus, the technology disclosed herein, which includes the fixed wireless terminal 29, which comprises the controller 40, as well as networks incorporating the fixed wireless terminal and methods of operation, differs from the aforementioned prior art GAN technology and nodes by, e.g., locating the controller 40 in a fixed wireless terminal 29 and using the controller 40 to perform a particular interworking, as described herein, and thereby provide a circuit switched mobile telephony core network service to the mobile wireless terminal.

1.2 Overview of GAN Client

In contrast to prior art GAN technology, the technology disclosed herein allows mobile wireless terminals to access and use CS-based mobile telephony CN services using the FWT, e.g., while in a Home or office, for example. As one aspect of the technology disclosed herein, and as shown in FIG. 5A, the mobile wireless terminal 30 comprises a GAN/UMA client, also known as the GAN client 50. The GAN/UMA client 50 is an integrated part of the MS/UE implementation and comprise multiple different protocol layers as defined, for example, in 3GPP TS 43.318 and 44.318. Examples of the layers used by the GAN client 50 are generic access resource control (GA-RC), generic access circuit switched resources (GA-CSR), generic access packet switched resources (GA-PSR), etc., e.g., the layers shown below the Mobility Management (MM) layer in FIG. 7. A function of the Mobility Management layer is to support the mobility of wireless terminals, such as informing the network of the present location of the wireless terminals and providing user confidentiality. The GAN/UMA client 50 comprises both a Circuit-Switched part (GA-CSR) and a Packet Switched Part (GA-PSR)

In one example implementation, GAN client 50 in the mobile wireless terminal 30 is used only for the CS domain services. In such example implementation, packet switched (PS) domain services in the mobile terminal may use the Home LAN technology, e.g., WLAN/WiFi, directly and without any GAN/UMA client. But in another alternative implementation the GAN client 50 is also used for the PS domain services.

As an aspect of the technology disclosed herein, GAN/UMA protocols are used over the Home LAN, e.g., WLAN/WiFi, between the mobile terminal and the FWT device. For example, in an example implementation the circuit switched part of the GAN client 50 is used but instead of the packet switched part GA-PSR the mobile wireless terminal 30 uses plain WiFi to access the services provided by the FWT device.

1.3 Overview of Interworking

As indicated above and further described below, the controller 40 of fixed wireless terminal 29 includes functionality needed for interworking between GAN protocol signaling and mobile CS protocol signaling in both directions. In the example embodiment of FIG. 5A such functionality is illustrated as interworking unit 42.

1.4 Overview of System Operation

Figure 5B:
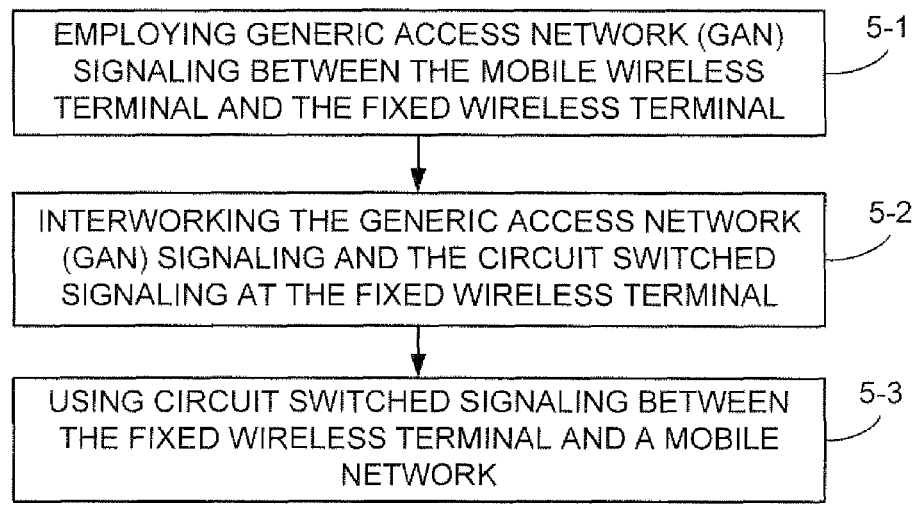
FIG. 5B is a flowchart illustrating basic acts or steps involved in a method of operating a communications system according to an example embodiment and mode.

FIG. 5B illustrates basic acts or steps involved in a method of operating a communications system according to an example embodiment and mode for providing circuit switched mobile telephony core network service to a mobile wireless terminal. Act 5-1 comprises employing Generic Access Network (GAN) signaling between the mobile wireless terminal 30 and the fixed wireless terminal 29. Act 5-2 comprises interworking the Generic Access Network (GAN) signaling and the circuit switched signaling at the fixed wireless terminal. In an example embodiment and mode, the method further comprises using a controller for interworking the Generic Access Network (GAN) signaling and the circuit switched signaling at the fixed wireless terminal. Act 5-3 comprises using circuit switched signaling between the fixed wireless terminal 29 and the mobile network 22.

1.5 Overview of Configuration

According to an aspect of the technology disclosed herein a controller 40 is distributed and included in the different FWT devices and an automatic configuration of these small GANCs is provided. In an example embodiment the controller 40 uses the system information (SI) broadcasted in the mobile backhaul network to construct the GAN-specific system information. The GAN-specific system information, e.g., GAN-SI, is provided to the mobile wireless terminal as part of the GAN registration procedure (as defined in 3GPP TS 43.318 and 44.318) between the mobile wireless terminal and the small GANC in the FWT device. GAN-SI is provided to the mobile wireless terminals but it can be also seen as part of the GANC configuration as the GANC needs to be configured with the GAN-SI before the GAN-SI can be provided to any terminals.

1.6 Overview of Authentication

As also described herein, specific techniques are provided for authentication and ciphering. The FWT must be authenticated in order to access the mobile network(s). Two different authentication techniques may be used for authentication.

A first authentication technique involves the FWT-UE, e.g., the fixed wireless terminal acting as a user equipment (UE) towards the mobile network, being authenticated by the mobile network, using, e.g., MM level procedures. This first authentication technique involves (U)SIM-based authentication and also results in the provision of ciphering keys which are used for ciphering over the radio link between the FWT-UE and the mobile network. As a result of this first authentication technique all transactions forwarded by the FWT-UE for the different devices connected to it are charged on the subscription used for the authentication, i.e., on the subscription in or for the FWT device. Advantageously, this first authentication technique does not require any standardization changes.

A second basic authentication technique is that the mobile wireless terminal connected to the FWT device, e.g., the "real UE", is also authenticated by the mobile network, using, e.g., MM level procedures. This second basic authentication technique has two different implementations. The common denominator of both implementations of the second authentication technique is that all transactions created by the mobile wireless terminal are charged on the subscription for the mobile wireless terminal.

According to a first example implementation of the second authentication technique, authentication of the mobile wireless terminal is performed by the mobile network, and ciphering is then used between the mobile wireless terminal and the mobile network, in a manner that is transparent to the FWT device. The traffic is then encrypted twice between the FWT and the mobile wireless terminal, e.g., the Real-UE: first using the underlying IPsec tunnel between the mobile wireless terminal and the Security Gateway (SEGW) 43 in the FWT device, and then, in addition, through the use of the mobile network encryption between the mobile wireless terminal and the mobile network. With this first example implementation of the second authentication technique a change is needed to the GAN-protocols so that the mobile wireless terminal uses the ciphering keys for encryption after being authenticated by the mobile network. Relevant GAN specifications in 3GPP for this first example implementation of the second authentication technique include TS 43.318 and TS 44.318.

According to a second implementation of the second authentication technique the mobile network authenticates both the mobile wireless terminal, e.g., the "Real-UE", and the FWT, e.g., the "FWT-UE", and combines authentication and ciphering contexts for the mobile wireless terminal and the FWT. The traffic over the mobile network is then encrypted based on the authentication towards the FWT and the traffic between the fixed wireless terminal (FWT) and the mobile wireless terminal is encrypted once using the underlying IPsec tunnel. With this second implementation of the second authentication technique the NAS signalling is enhanced with separate authentication and ciphering contexts, but no changes are needed to the GAN protocols. A relevant NAS specification in 3GPP for the second implementation of the second authentication technique includes TS 24.008.

Thus, methods and procedures are herein provided to allow mobile wireless terminals to access and use CS-based mobile telephony CN services using the FWT solutions while in a localized situation such as the Home or office. The technology disclosed herein employs the GAN/UMA client 50 in the mobile wireless terminal 30 and usage of GAN/UMA protocols over the Home/office LAN, e.g., WLAN/WiFi, between the mobile terminal and the fixed wireless terminal (FWT) device. The fixed wireless terminal device comprises functionality to interwork the GAN protocol signaling to the mobile CS signaling towards the mobile RAN and CN.

2.0 Basic Network and Protocol Architecture

Figure 3A:
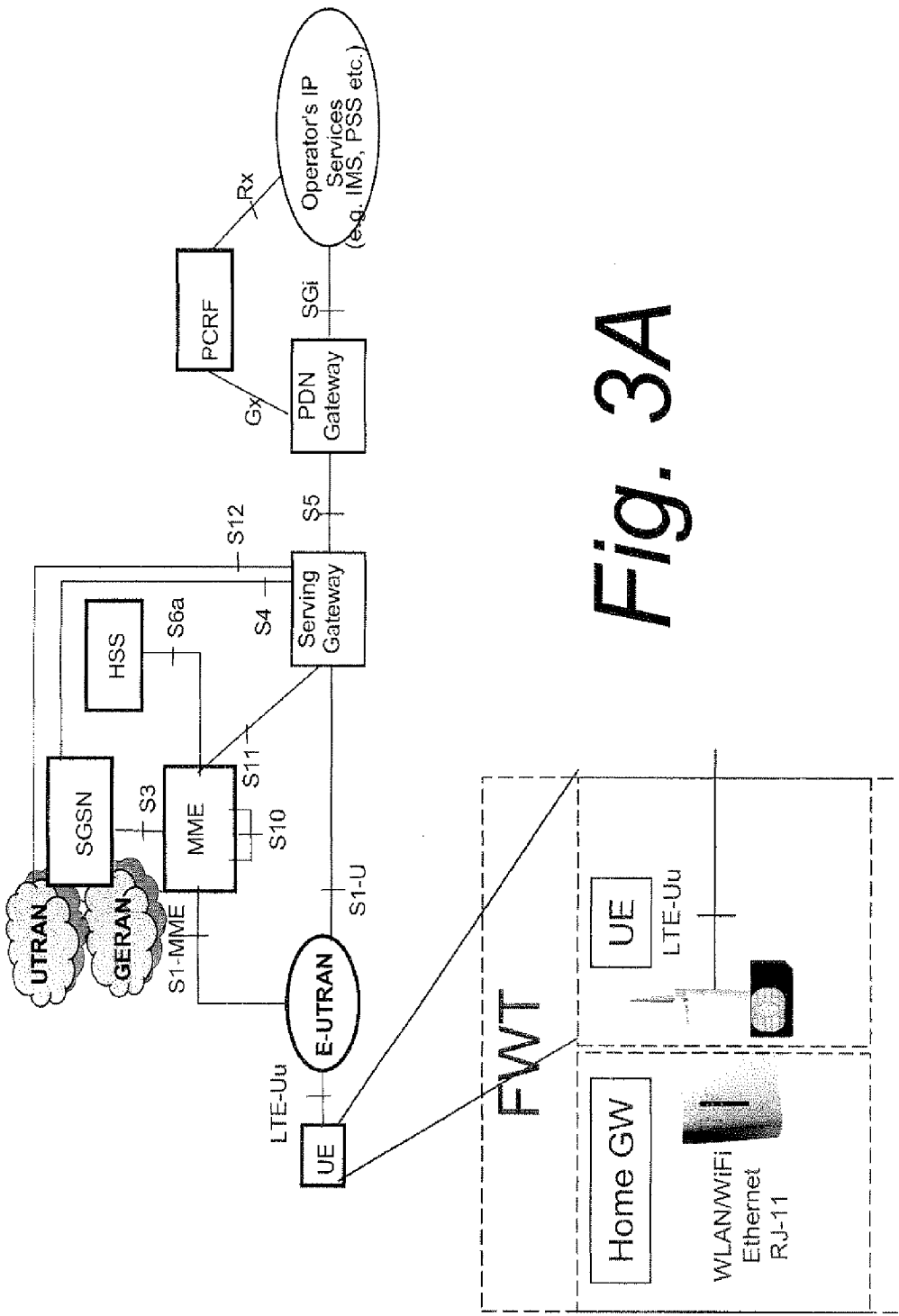
FIG. 3A is a diagrammatic view illustrating an example fixed wireless terminal as comprising a Home Gateway and a user equipment unit (UE) towards a SAE/LTE network.
Figure 3B:
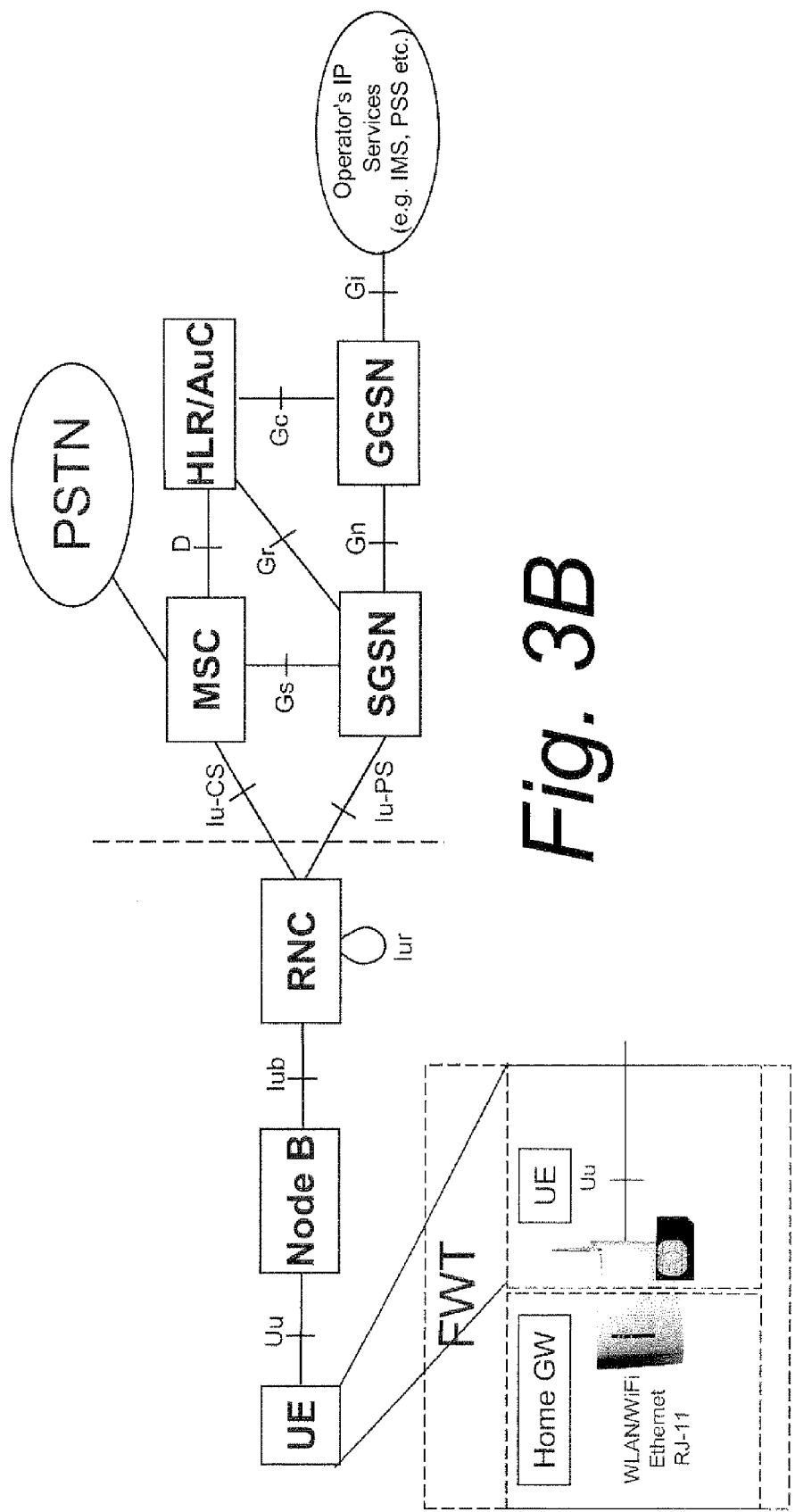
FIG. 3B is a diagrammatic view illustrating an example fixed wireless terminal as comprising a Home Gateway and a user equipment unit (UE) towards a UMTS network.
Figure 8:
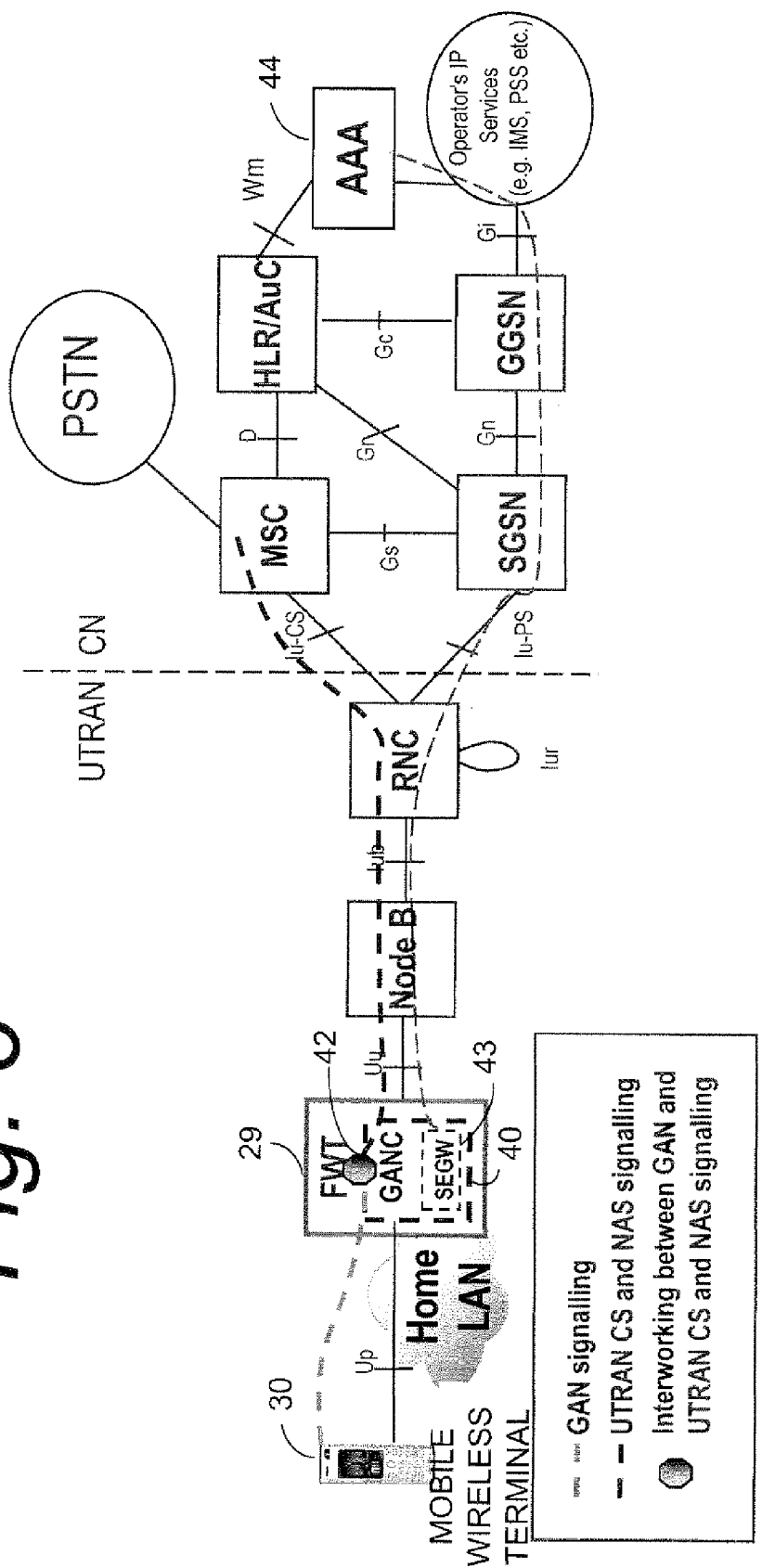
FIG. 8 is a schematic view of a communications network illustrating network architecture when GAN signaling is used between a mobile wireless terminal and a fixed wireless terminal

FIG. 8 shows network architecture when GAN signaling is used between the mobile wireless terminal 30 and the fixed wireless terminal (FWT) 29. The fixed wireless terminal (FWT) 29 comprises interworking function, e.g., interworking unit 42, that converts between the GAN signaling towards the mobile wireless terminal 30 and the UTRAN radio resource control (RRC)/CN NAS signaling towards the mobile circuit switched (CS) backhaul connection. The "backhaul connection" refers, e.g., to the interface between the fixed wireless terminal and the mobile network, and especially the circuit switched parts of the mobile network, for example, the Uu interface in FIG. 3B. Further describing FIG. 8, the "dashed" line between the mobile wireless terminal 30 and the fixed wireless terminal (FWT) 29 extends or travels over the Up-interface. The circle within the fixed wireless terminal (FWT) 29 depicts the interworking function 42. The "dashed" line between the fixed wireless terminal (FWT) 29 and the mobile switching center (MSC) indicates the UTRAN and core network (CN) specific signaling that is used towards the Node B, the RNC and the MSC. As understood in the art, "mobile backhaul" or "wireless backhaul" is the portion of a wireless network or mobile network that connects information traveling from a wireless node to a mobile switching center.

FIG. 8 shows the UMTS network being used as the mobile backhaul. However, any mobile network technology providing possibility to connect to circuit switched (CS) domain services can be used, for example GSM and CDMA are good other examples. One additional aspect shown in FIG. 8 is authentication/authorization/accounting (AAA) server 44 that the Security Gateway (SEGW) 43 in fixed wireless terminal (FWT) 29 uses to authenticate the mobile wireless terminals connecting to the SEGW 43. The example shown in FIG. 8 is the case when the GANC-SEGW uses the packet switched (PS) domain, and the packet switched (PS) access provided by the fixed wireless terminal (FWT) 29, to get access to AAA server 44.

Figure 9:
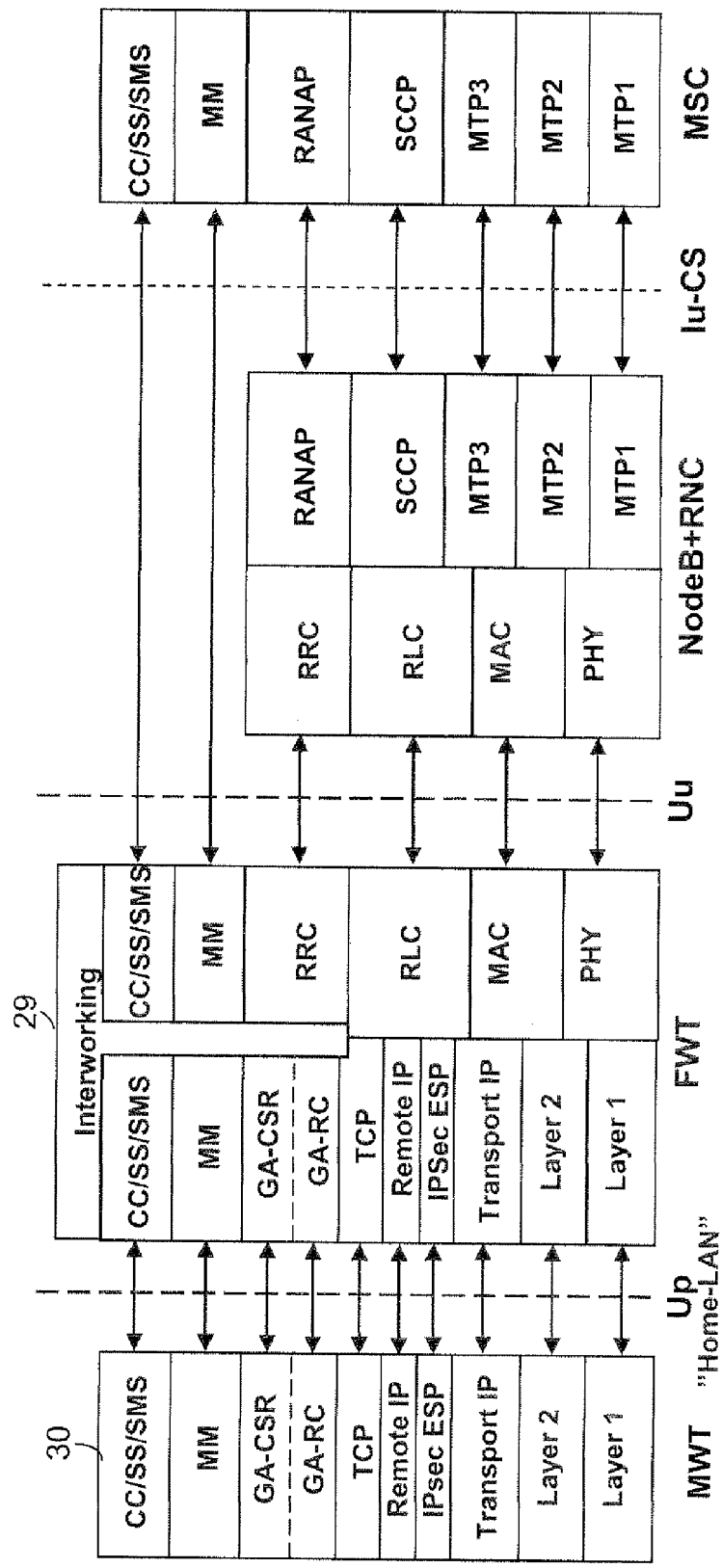
FIG. 9 is a diagrammatic view illustrating protocol architecture for the architecture of FIG. 8.

FIG. 9 shows the protocol architecture for the solution in FIG. 8. In FIG. 9 the base station (BS) node, e.g., NodeB, and the radio network controller (RNC) are shown as a combined node as the UTRAN internal network architecture is not important for the technology disclosed herein. The GAN protocols are used in the Up-interface between the mobile wireless terminal 30 and the fixed wireless terminal (FWT) 29. The fixed wireless terminal (FWT) 29 comprises the functionality for interworking, e.g., interworking unit 42, towards UTRAN and Core Network (CN) protocols, e.g., toward the Mobile Switching Center (MSC). The NAS-protocols, e.g., Mobility Management (MM) and above, are not impacted. The fixed wireless terminal (FWT) 29 only performs interworking between the GAN and UTRAN or GSM EDGE Radio Access Network (GERAN) radio resource (RR) protocols. However, there is one exception to the impact on NAS-protocols—authentication, as described herein.

3.0 Identifying FWT Device Attachment to the Network

When the fixed wireless terminal (FWT) 29 attaches to the network, the network may need to know that a fixed wireless terminal device is being used. The network may need to know that the fixed wireless terminal is being used due to, for example, security reasons and to not open up direct connectivity to the AAA server 44 from any type of wireless terminal being connected to the mobile network.

The fixed wireless terminal (FWT) 29 may, for example, create a separate packet data protocol (PDP) context or public data network (PDN) connection for the traffic towards the AAA server 44. This could be, for example, identified by a specific Access Point Name (APN) indicating "AAA-server traffic".

A PDP context, or other similar concept, is always needed for any wireless terminal to communicate in the packet switched (PS) domain as, e.g., the PDP context is the way the fixed wireless terminal gets a specific IP-address. If there is a separate PDP context for the traffic towards AAA server 44, then the network can be configured so that only the FWT 29 is allowed to access the IP-address of the AAA server 44. So the PDP context essentially serves as an extra measure to achieve more security.

Another PDP context may be established for the "Normal IP traffic". The "Normal IP traffic" PDP context is used by the fixed wireless terminal (FWT) 29 to provide, for example, Internet access to Home devices.

The PDP contexts are established using the known 3GPP principles. For example, the mobile subscription for the fixed wireless terminal (FWT) 29 may indicate that the fixed wireless terminal (FWT) 29 is allowed to establish two separate PDP contexts. A first of these two separate contexts is for traffic towards AAA server 44; a second of the PDP contexts is for the "Normal IP traffic". Another alternative is that the mobile network opens the connectivity to AAA server 44 only for fixed wireless terminal devices. So the network needs to know when a fixed wireless terminal is attaching to the network and establishing the PDP context(s). The separate PDP context or PDN connection, or alternatively, the knowledge by the network that a fixed wireless terminal is attaching to the network and is establishing the PDP context or PDN connection, would then permit the fixed wireless terminal to communicate with the AAA server so that the fixed wireless terminal can, for example, authenticate an IPsec tunnel between the fixed wireless terminal and the mobile wireless terminal.

3.1 First Technique of Identifying FWT Device Attachment

Figure 18A:
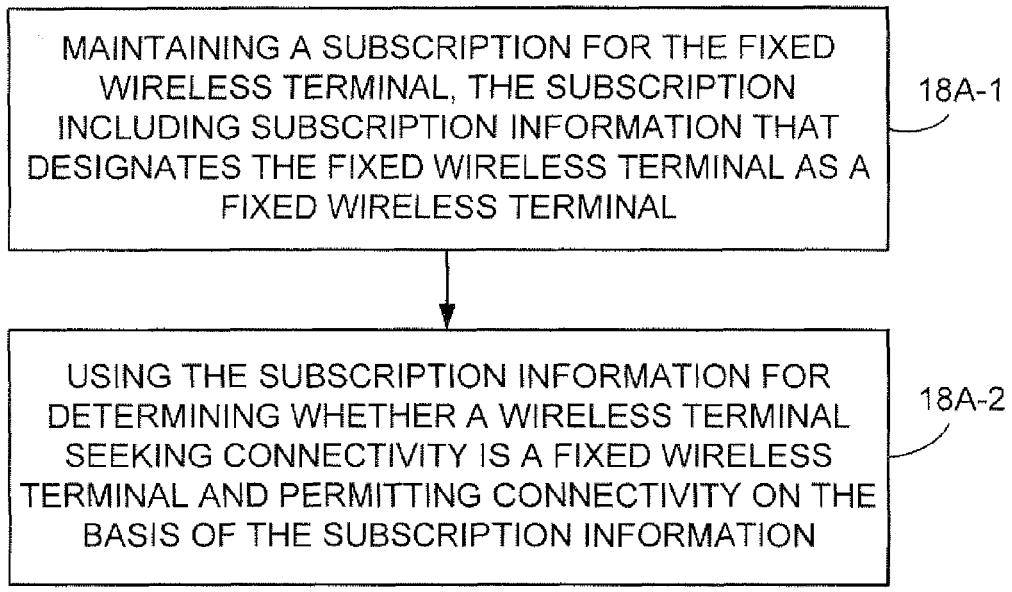
FIG. 18A is a flowchart illustrating basic, representative acts or steps involved in a method of operating a communications system, including identification of a fixed wireless terminal according to a first mode.

One technique for identifying that a fixed wireless terminal device is attached to the network is illustrated by FIG. 18A. In essence, according to the first technique the mobile subscription belonging to a fixed wireless terminal is marked as "FWT subscription" in the network, e.g., in the home subscriber server/home location register (HSS/HLR). FIG. 18A shows basic, representative acts or steps involved in a method of operating a communications system, including identification of a fixed wireless terminal according to a first technique.

Act 18A-1 comprises the core network maintaining a subscription for the fixed wireless terminal, the subscription including subscription information that indicates subscription for a fixed wireless terminal when a device type of the fixed wireless terminal is designated as a fixed wireless terminal. The subscription includes subscription information, such as a device type, that designates the fixed wireless terminal as fixed wireless terminal or that designates the subscription as a subscription for a fixed wireless terminal Act 18A-2 comprises the mobile network using the subscription information for determining whether a wireless terminal seeking connectivity is a fixed wireless terminal and permitting connectivity on the basis of the subscription information.

3.2 Second Technique of Identifying FWT Device Attachment

Figure 18B:
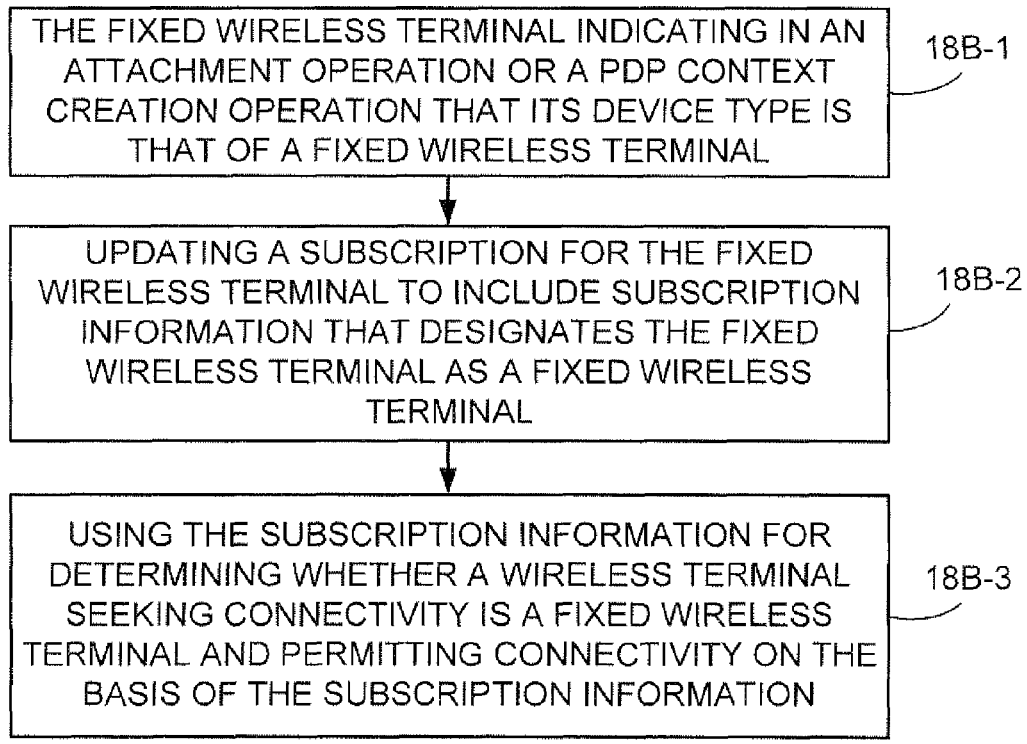
FIG. 18B is a flowchart illustrating basic, representative acts or steps involved in a method of operating a communications system, including identification of a fixed wireless terminal according to a second mode.

FIG. 18B shows basic, representative acts or steps involved in a method of operating a communications system, including identification of a fixed wireless terminal according to a second technique. In essence, according to the second technique the fixed wireless terminal indicates as part of the attachment or PDP context creation or PDN connection to the network that the "device type" is "FWT device". By doing this the network could update the HSS/HLR dynamically, e.g., learn which mobile subscriptions are used for fixed wireless terminal devices.

Act 18B-1 comprises the fixed wireless terminal indicating in an attachment operation or a PDP context creation operation or PDN connection operation that its device type is that of a fixed wireless terminal. Act 18B-2 comprises, upon detecting that the device type indicated in the attachment operation or the PDP context creation operation or PDN connection operation is fixed wireless terminal, a core network updating a subscription for the fixed wireless terminal to include subscription information that indicates subscription for fixed wireless terminal or indicates that the device type for the fixed wireless terminal is fixed wireless terminal. The update of the subscription information may be preceded by some form of security check to confirm the device type indicated from the terminal. For example, the mobile network may request the terminal to return its IMEI and this could be checked against an IMEI-list of known fixed wireless terminals. Act 18B-3 comprises the mobile network using the subscription information for determining whether a wireless terminal seeking connectivity is a fixed wireless terminal and permitting connectivity on the basis of the subscription information.

4.0 The Interworking Functionality Performed by the FWT

Circuit switched (CS) domain procedures between the mobile wireless terminal 30 and the network, e.g., SEGW, GANC and MSC, are now described. In an example embodiment an Internet Protocol (IP) security tunnel (IPsec tunnel) is established between mobile wireless terminal 30 and fixed wireless terminal (FWT) 29. This means that the fixed wireless terminal (FWT) 29 uses an interface known as the Wm-interface (understood with reference to FIG. 6) towards the AAA server 44 to authenticate that a mobile wireless terminal is allowed to establish the IPsec connection, and accordingly that the mobile wireless terminal is allowed to use the Generic Access Network (GAN) in combination with fixed wireless terminal devices. As used herein, the "IPsec tunnel" is also known as the "IPsec connection".

For GAN/UMA, the mobile wireless terminal determines or discovers an appropriate controller or gateway, e.g., a GANC and/or SEGW, to use to enable authentication. In general, the appropriate controller or gateway which enables authentication is a "local" controller or gateway as opposed to a provisioning and/or default gateway. The "local" controller GANC or gateway SEGW are located in the FWT device and the provisioning and/or default gateway are located higher up in the network, i.e. not in the FWT device in this case. In an example embodiment illustrated in FIG. 10, the GAN client 50 comprises a GANC/SEGW seeker or location unit 52. The seeker unit 52 may comprise or be external to an authentication agent 54. In an example embodiment and mode, the mobile wireless terminal, e.g., using its seeker unit 52, seeks the appropriate controller and/or gateway in the FWT device to enable authentication. After being found, the appropriate controller or gateway authenticates the mobile wireless terminal so that the mobile wireless terminal is allowed to establish an Internet Protocol security (IPsec) connection with the appropriate controller or gateway.

Figure 10:
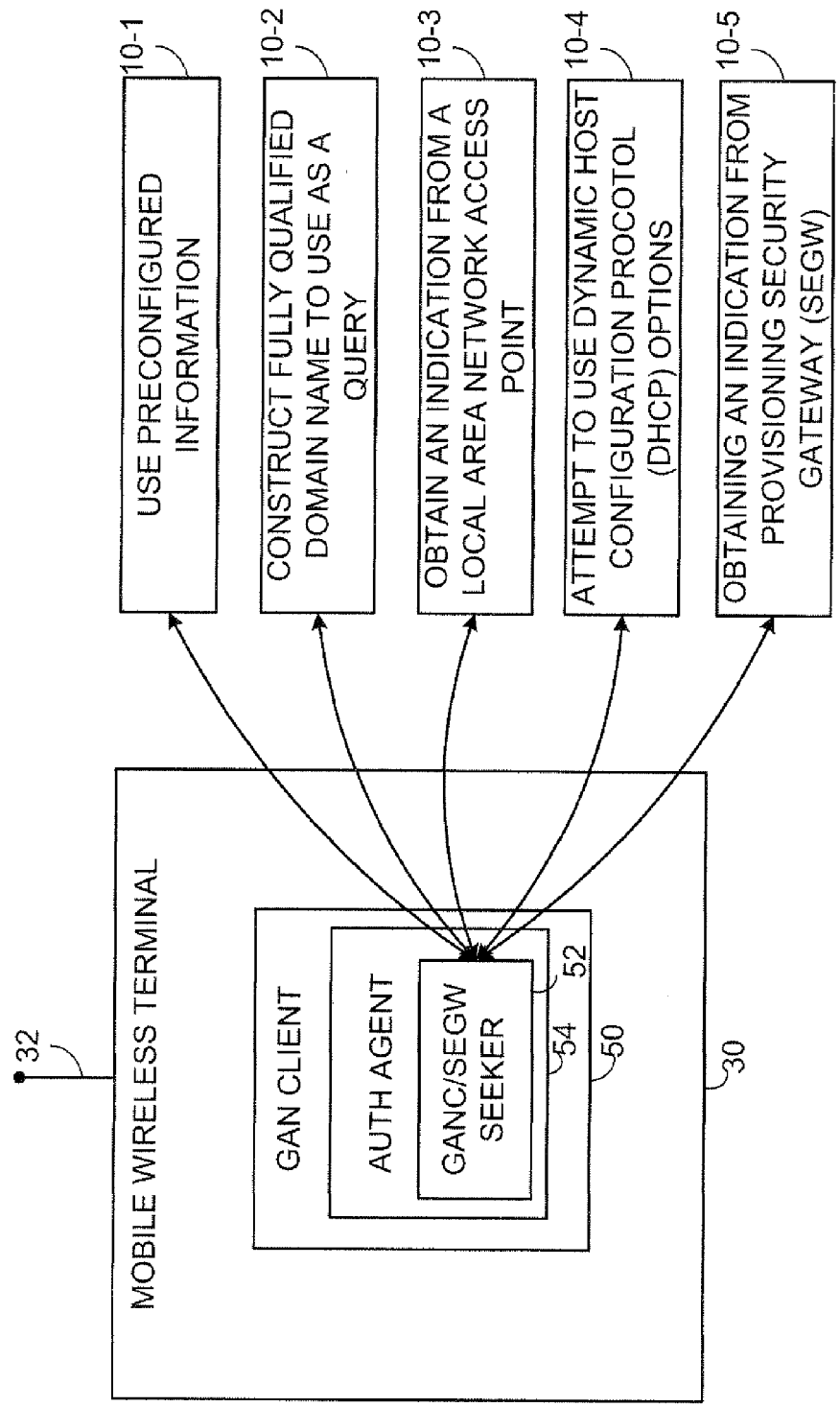
FIG. 10 is a schematic view of an example embodiment of a mobile wireless terminal further depicting various modes for determining a Generic Access Network Controller (GANC)/Security Gateway (SEGW) for authentication purposes.

There are several ways in which the mobile wireless terminal may discover which SEGW and GANC to use. In other words, and as illustrated by FIG. 10, there are several example techniques for the mobile wireless terminal to seek an appropriate controller or gateway to enable authentication. It should be appreciated that, in other embodiments, a combination of two or more of the example techniques illustrated in FIG. 10, or yet other techniques, may be utilized for seeking the appropriate controller or gateway.

In a first example seeking technique represented by act 10-1 of FIG. 10, the method further comprises providing preconfigured information to the mobile wireless terminal so that the mobile wireless terminal uses the preconfigured information for seeking the appropriate controller or gateway. The preconfigured information may be stored at or otherwise made available to the mobile wireless terminal.

In another example seeking technique represented by act 10-2 of FIG. 10, the method further comprises the mobile wireless terminal constructing at least one fully qualified domain name to use as a query; and, the mobile wireless terminal using the query to obtain an address of the appropriate controller or gateway from a domain name server (DNS). In other words, the mobile wireless terminal may construct two different fully qualified domain names (FQDNs) from its international mobile subscriber identity (IMSI), and use the two different FQDNs to query a domain name system (DNS) server to obtain from the DNS server the Internet Protocol (IP) addresses of the appropriate SEGW and the appropriate GANC to use, as generally discussed and as defined in 3GPP TS 23.003.

Two non-limiting examples are now provided to illustrate the mobile wireless terminal constructing two different fully qualified domain names (FQDNs) from its international mobile subscriber identity (IMSI). In a first example of obtaining a GANC-SEGW FQDN, the IMSI in use is 234150999999999, where the mobile country code (MCC)=234; where the mobile network code (MNC)=15; and the mobile subscriber identification number (MSIN)=0999999999, and a FQDN of psegw.gan.mnc015.mcc234.pub.3gppnetwork.org is obtained. In a second example, the IMSI in use is 234150999999999, where MCC=234; MNC=15; MSIN=0999999999, and a FQDN of pganc.gan.mnc015.mcc234.pub.3gppnetwork.org results.

Other techniques may also be viewed as variants of the foregoing. For example, in another example seeking technique represented by act 10-3 of FIG. 10, the method further comprises the mobile wireless terminal attempting to obtain an indication of the appropriate controller or gateway from a local area network access point. Thus, as a variant, which would involve a change of the GAN/UMA standard, a mobile wireless terminal first attempts to determine if the access point with which the mobile wireless terminal has established LAN contact can provide the SEGW and GANC functionality, e.g., a default gateway for the mobile wireless terminal Whereas the access point here may be, for example, the FWT 29, the "default gateway" may be the IP network default gateway.

As another technique or variant, the method may comprise the fixed wireless terminal intercepting the query and responding to the mobile wireless terminal with an address of the fixed wireless terminal to use as the appropriate controller or gateway from a domain name server (DNS). In other words, the fixed wireless terminal (FWT) observes the DNS traffic and intercepts and answers GAN/UMA related queries, e.g., replies to the mobile wireless terminal with its own IP addresses. This is possible since the format of FQDNs to use for GAN/UMA is standardized. The DNS traffic can be identified based on the destination transmission control protocol (TCP) or user datagram protocol (UDP) port used in the queries as the port number 53 has been allocated for DNS traffic. Both TCP and UDP use port 53 for DNS.

In another example seeking technique or variant represented by act 10-4 of FIG. 10, the method further comprises the mobile wireless terminal attempting to use Dynamic Host Configuration Protocol (DHCP) options to obtain an indication of the appropriate controller or gateway from a local area network access point. Dynamic host configuration protocol (DHCP) options may be used to provide SEGW/GANC address information. The existing DHCP Options are defined in RFC2132 (DHCP Options and BOOTP Vendor Extensions) and involve a DHCP Server providing additional information to the client, in addition to the IP-address allocation that is the main purpose of the DHCP procedure. For example, a DNS Server name can be returned to the client as DHCP Option 6. The domain name server option specifies a list of Domain Name System name servers available to the client. In a similar way, new DHCP Options may be created for the GANC-SEGW and GANC addresses.

In another example seeking technique represented by act 10-5 of FIG. 10, the method further comprises the mobile wireless terminal obtaining an indication of the appropriate SEGW and GANC from another GANC, e.g., a provisioning and/or default GANC; and the provisioning and/or the default GANC redirecting the mobile wireless terminal to the appropriate controller or gateway. This technique involves inclusion of a provisioning and/or default SEGW and provisioning and/or default GANC in the network. According to this technique or variant the mobile wireless terminal discovers and connects to the provisioning and/or default SEGW and provisioning and/or default GANC as in standard GAN/UMA technology. The provisioning and/or default SEGW and the provisioning and/or default GANC may redirect the mobile wireless terminal to the local SEGW/GANC, e.g., the SEGW/GANC located in the fixed wireless terminal.

In an example implementation, the method further comprises the provisioning and/or default gateway being agnostic whether the fixed wireless terminal supports the GANC functionality upon redirecting the mobile wireless terminal to the fixed wireless terminal. That is, the provisioning and/or default GANC may, in a simple case, do this redirect blindly based on the access point IP address received in the discovery message received from the mobile wireless terminal. Doing this blindly means that the provisioning and/or default GANC does not know if the fixed wireless terminal supports GANC functionality or not, so the mobile wireless terminal attempts to establish IPSec and then perform the GAN registration towards the fixed wireless terminal. If the fixed wireless terminal does not support the SEGW and the GANC functionality, then the fallback procedures in GAN would lead to the mobile wireless terminal connecting to the provisioning and/or default SEGW and GANC again, with the provisioning and/or default GANC then instructing the mobile wireless terminal to use another SEGW/GANC.

Yet other variants are possible when the provisioning GANC uses more advanced algorithms, e.g., knows the identity of the fixed wireless terminal and what the fixed wireless terminal supports, and thus can avoid the aforementioned blind variant.

Some Generic Access Network (GAN) specific signalling and protocols, for example GAN Discovery, GAN Registration, GAN Registration Update, GAN Keep Alive procedures, are terminated in the fixed wireless terminal. Some other GAN specific signaling, for example generic access resource control (GA-RC) connection establishment, is interworked towards the mobile backhaul protocols that are dependent on the type of mobile backhaul being used. For example, if WCDMA is used as the mobile backhaul then these protocols are described in 3GPP TS 25.331; if GSM is used as the mobile backhaul then these protocols are described in 3GPP TS 44.018. The above mentioned example GA-RC connection establishment would then be interworked mapped with the relevant RR/RRC connection establishment as described in these specifications.

The upper layer protocols, e.g., mobility management (MM) and above, for example MM, call control (CC), short message service (SMS), and supplementary services (SS) protocols as shown in FIG. 9, are used essentially unchanged between the mobile wireless terminal 30 and the fixed wireless terminal (FWT) 29, including but not limited to the following:

Most Mobility Management procedures, for example Location Update, Identity Request. One exception is Authentication, and related ciphering, that needs special solutions and this is further described herein.

Paging procedure between the MSC, the fixed wireless terminal, the GANC in the fixed wireless terminal, and the mobile wireless terminal 30.

All Connection Management (CM) procedures between the MS and the MSC, for example Call Control for both mobile-originated (MO) and mobile-terminated (MT) transactions, SMS, Supplementary Services.

5.0 GANC Configuration

In accordance with one aspect of the technology disclosed herein the GANC is distributed to the FWT-devices and connected below the mobile backhaul. Accordingly, in some cases normal operation and maintenance (O&M) procedures of a centralized network node may not apply to the case of the more distributed GANC.

The GANC is distributed and included in the different fixed wireless terminal devices. Therefore, an automatic configuration of these small, distributed GANCs is needed. In an example embodiment and mode illustrated by FIG. 11, where the WCDMA and UTRAN case is used as an example, the GANC 40 uses system information (SI) broadcasted in the mobile backhaul to construct the GAN-specific system information.

Figure 11:
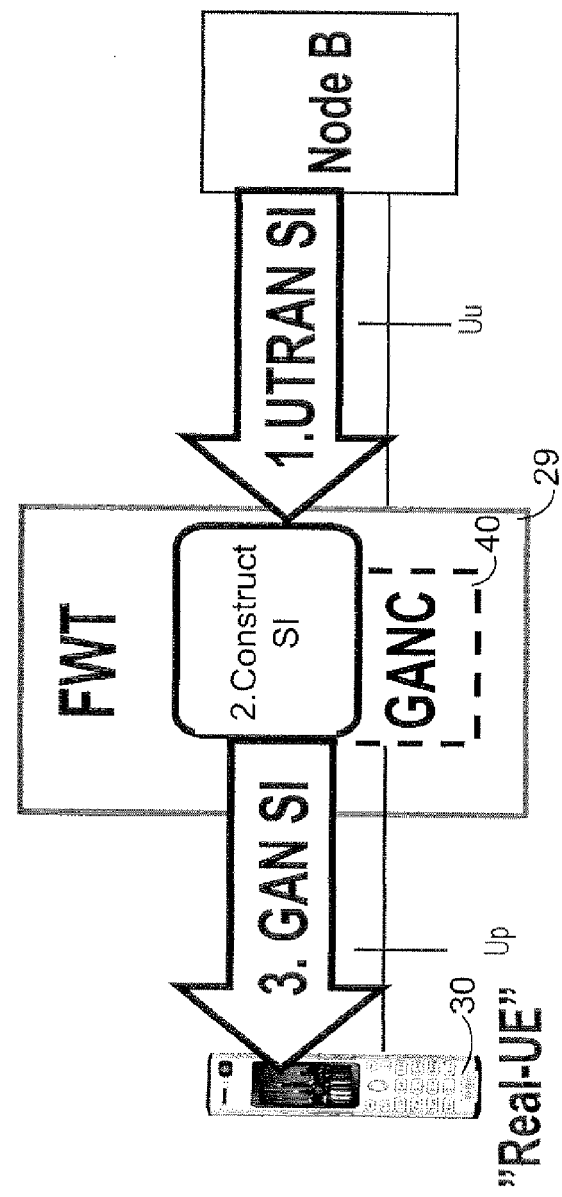
FIG. 11 is a diagrammatic view illustrating Generic Access Network controller (GANC) using system information (SI) broadcasted in the mobile backhaul, e.g., the mobile backhaul network which comprises the link from the fixed wireless terminal towards the mobile network, to construct the GAN-specific system information.

In the above regard, in an example embodiment and mode the GAN specific system information is included in a GA-RC_REGISTER ACCEPT message that the GANC 40 returns to the MWT 30 as part of a successful GAN registration. One example of an Information Element included in this message is the GAN Control Channel Description that contains, for example, the following fields: Network Mode of Operation; MSC Release; and T3212 timer value. Other examples are the Location Area Identity and Cell Identity fields. This information is also included in the mobile network system information that the fixed wireless terminal (FWT) receives on the mobile backhaul, e.g., on the link towards the mobile network, as depicted by act 1 in FIG. 11. The fixed wireless terminal (FWT) 29 may, in its easiest mode of operation, just copy the mobile network system information to the GAN system information, as depicted by act 2 in FIG. 11. Another variant involves use of specific mapping tables in the FWT so that a specific system information field value used in the mobile network is mapped to a specific GAN system information (GAN SI) field value. Still another variant is that the FWT uses default values for some the GAN system information. Act 3 of FIG. 11 shows the GANC system information being sent from the fixed wireless terminal (FWT) 29 to the mobile wireless terminal 30.

To summarize, once the local GANC in the FWT device has been configured with the GAN SI information, this GAN SI can be provided to the mobile wireless terminal connecting to the local GANC as part of the GAN registration procedure (as defined in 3GPP TS 43.318 and 44.318) between the mobile wireless terminal and the local GANC. The GAN SI provides the mobile wireless terminal for example with information that is needed by the upper NAS layers in the mobile wireless terminal to perform, for example, Location Update procedures towards a MSC in the mobile network, which mobile network is beyond or behind the GANC and FWT from the perspective of the mobile wireless terminal Examples of this are the mentioned Location Area Identity (LAI) that indicates the Location Area of the Local GANC and the T3212 timer value that indicates how often periodic location updates are to be performed towards the MSC. The GAN SI also informs the mobile wireless terminal about different services available in the mobile network, and what is the current 3GPP release version of the MSC in the mobile network (i.e. MSC Release). In addition, the GAN SI also provides the mobile wireless terminal with information about how the mobile wireless terminal shall access the local GANC. For example, the TU3906 timer value indicates to the mobile wireless terminal how often it shall perform the Keep Alive procedure towards the local GANC.

6.0 Authentication

As evident from the foregoing, as one aspect of the technology disclosed herein there are two wireless terminals, the fixed wireless terminal ("FWT-UE") and the mobile wireless terminal ("real-UE") which is connected to the fixed wireless terminal. The existence of these two wireless terminals presents some issues for the authentication that needs to be performed in the mobility management (MM) layer.

Figure 12:
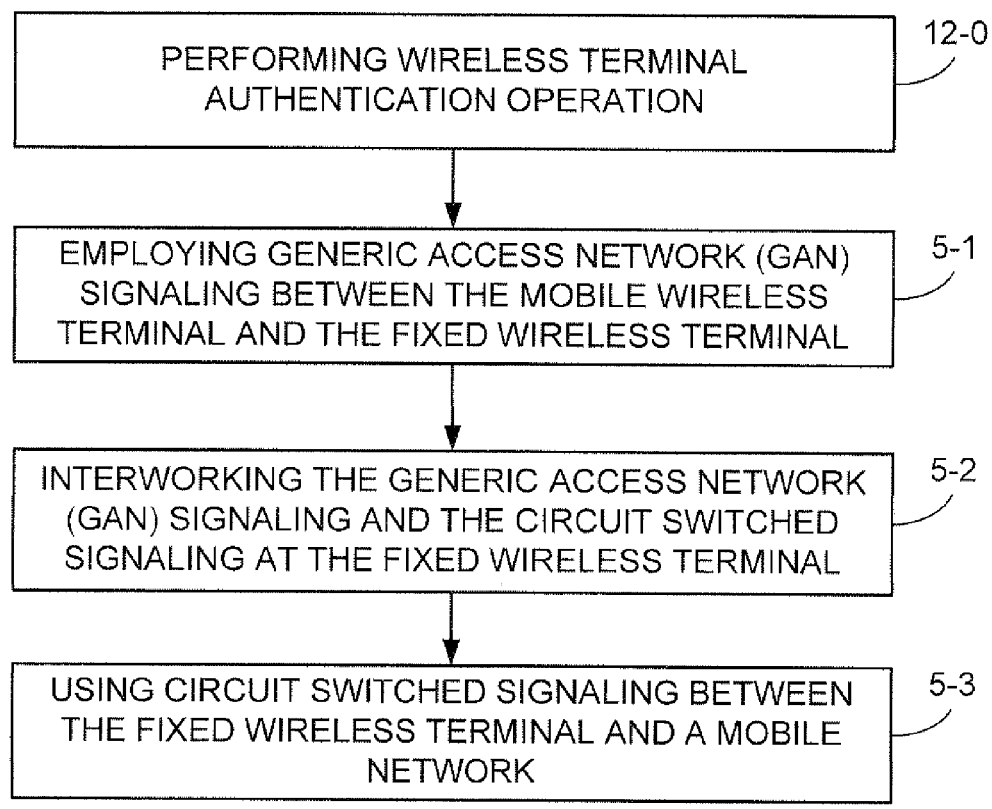
FIG. 12 is a flowchart illustrating basic acts or steps involved in a method of operating a communications system according to an example embodiment and mode which includes performing a wireless terminal authentication operation.

FIG. 12 shows basic acts or steps involved in a method of operating a communications system according to an example embodiment and mode which includes performing a wireless terminal authentication operation. Act 12-0 comprises performing the wireless terminal authentication operation. Act 12-0 precedes other acts, such as the acts shown and described with reference to FIG. 5B. The wireless terminal authentication operation may involve authentication of both the fixed wireless terminal (FWT) 29 and the mobile wireless terminal 30.

6.1 First Authentication Technique

Figure 13A:
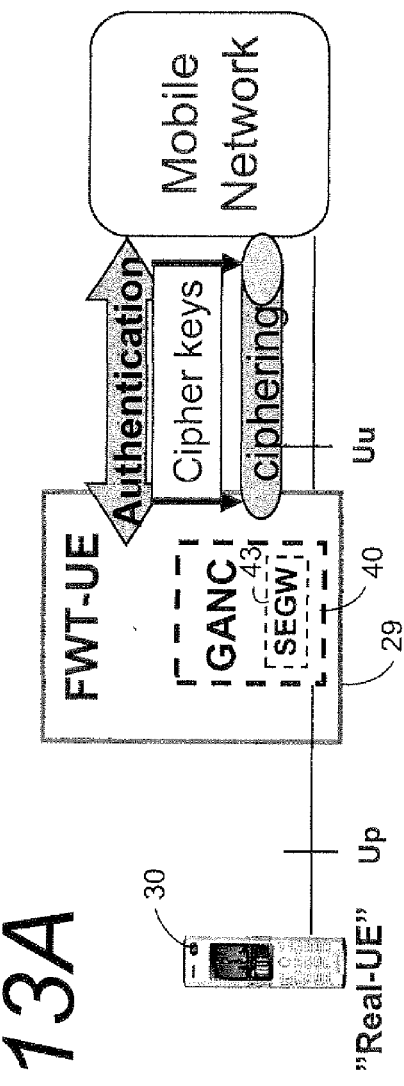
FIG. 13A is a diagrammatic view illustrating example acts of authentication of a fixed wireless terminal, e.g., FWT-UE, by the mobile network using Mobility Management (MM) level procedures.

FIG. 13A shows how the FWT-UE, e.g., the "UE" parts of the fixed wireless terminal (FWT) 29, is authenticated by the mobile network, using Mobility Management (MM) level procedures, according to a first authentication technique. FIG. 13A illustrates an example embodiment and mode which is an (U)SIM-based authentication and which also results in ciphering keys used for ciphering over the radio link between the FWT-UE and the mobile network. The authentication also results in that all transactions created by the FWT-UE are then charged on the subscription used for the authentication.

The first authentication technique involves the FWT-UE, e.g., the fixed wireless terminal acting as a user equipment (UE) towards the mobile network, being authenticated by the mobile network using, e.g., MM level procedures. This first authentication technique involves (U)SIM-based authentication and also results in the provision of ciphering keys which are used for ciphering over the radio link between the FWT-UE and the mobile network. As a result of this first authentication technique all transactions forwarded by the FWT-UE for the different devices connected to it are charged on the subscription used for the authentication, i.e., on the subscription in or for the FWT device. In essence, the mobile wireless terminal connected to the FWT 29 is not visible to the mobile network. Advantageously, this first authentication technique does not require any standardization changes.

6.2 Second Authentication Technique

Figure 13B:
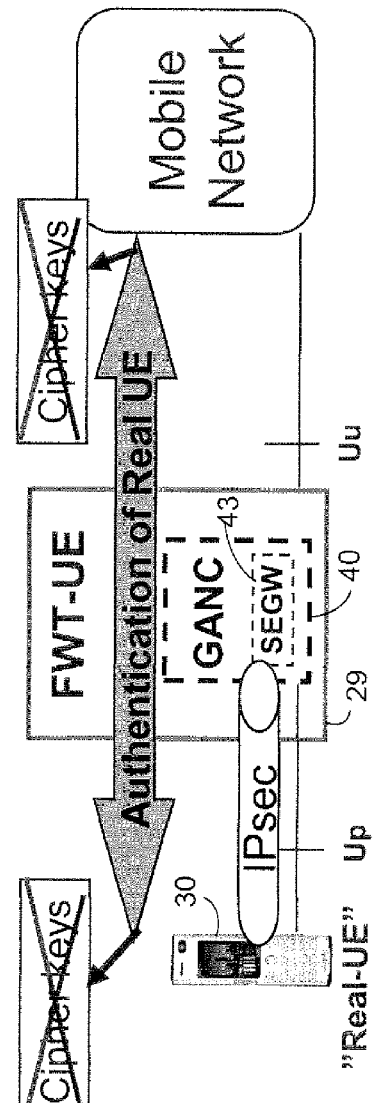
FIG. 13B is a diagrammatic view illustrating example acts of authentication of a mobile wireless terminal, e.g., Real-UE, by the mobile network using MM level procedures.

FIG. 13B shows how the Real-UE, e.g., mobile wireless terminal 30, is also authenticated by the mobile network, using MM level procedures, according to a second authentication technique. A difference is that in FIG. 13B the ciphering keys created as part of this authentication are not used for any ciphering according to the GAN specifications, 3GPP TS 43.318 and 44.318. That is, the ciphering is not done because the GAN specifications state that it should not be done. Instead, ciphering, or encryption, between the Real-UE and the GANC-SEGW in the fixed wireless terminal 29 is based on Internet Protocol security (IPsec).

Thus, in the second basic authentication technique the wireless mobile terminal connected to the FWT device, e.g., the "real UE", is also authenticated by the mobile network using, e.g., MM level procedures. The second authentication technology of FIG. 13B also highlights various authentication and ciphering issues addressed by the technology disclosed herein. Those issues are as follows:

It needs to be possible to charge traffic created by the Real-UE, e.g., mobile wireless terminal 30, on the subscription of the Real-UE, and therefore authentication of the Real-UE is desirable. However, this would also mean that the network would use the ciphering keys created as part of that authentication. This would be a possibility, but the current GAN specifications do not include this option.

Ciphering is also needed in the interface between the fixed wireless terminal (FWT) 29 and the mobile network, and here the only existing option would be to use the ciphering based on the authentication of the FWT-UE, e.g., the case shown in FIG. 13A.

There is currently no way to combine the Authentication of the Real-UE with the ciphering keys created based on the Authentication of the FWT-UE, e.g., the fixed wireless terminal (FWT) 29.

This second basic authentication technique has two different implementations. The common denominator of both implementations of the second authentication technique is that all transactions created by the mobile wireless terminal are charged on the subscription for the mobile wireless terminal.

6.2.1 Second Authentication Technique First Example Implementation

Figure 14A:
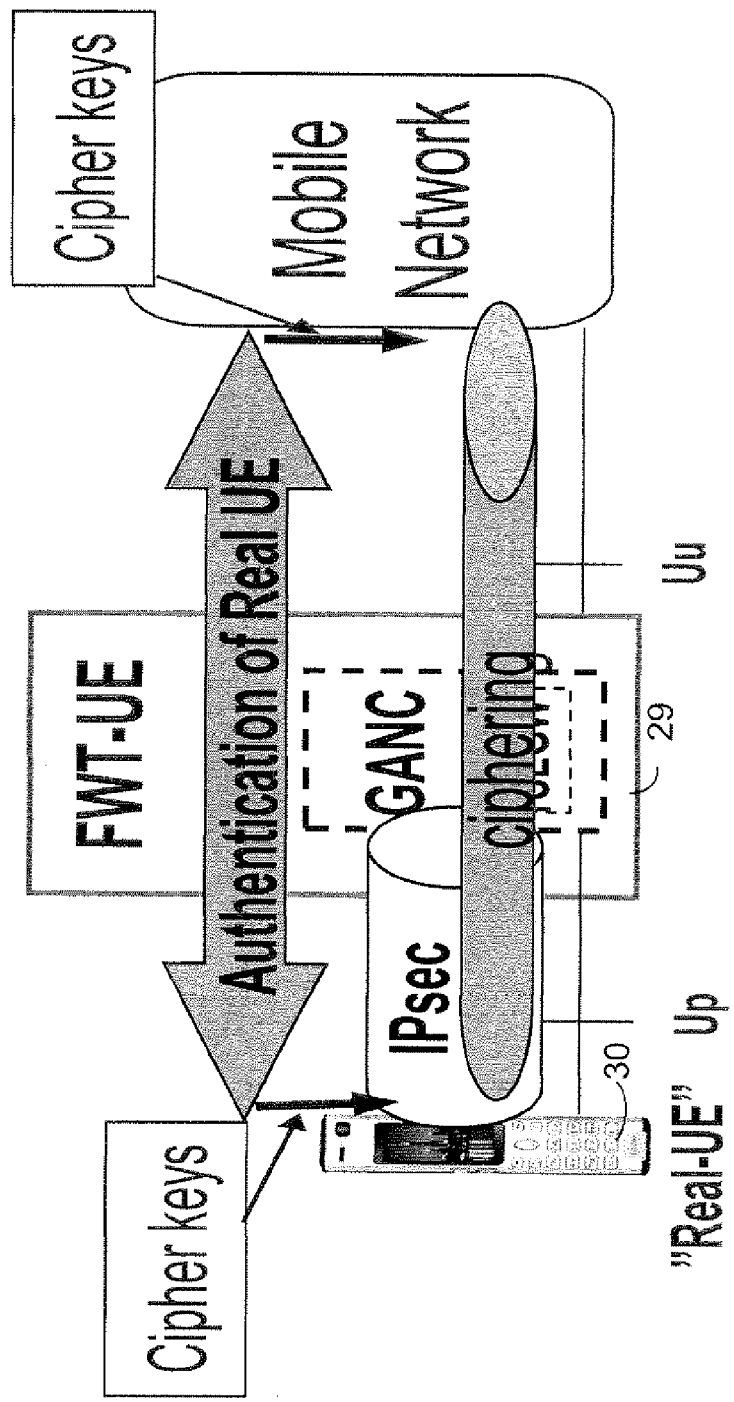
FIG. 14A is a diagrammatic view illustrating authentication of a mobile wireless terminal, e.g., Real-UE. and ciphering used "all the way".
Figure 14B:
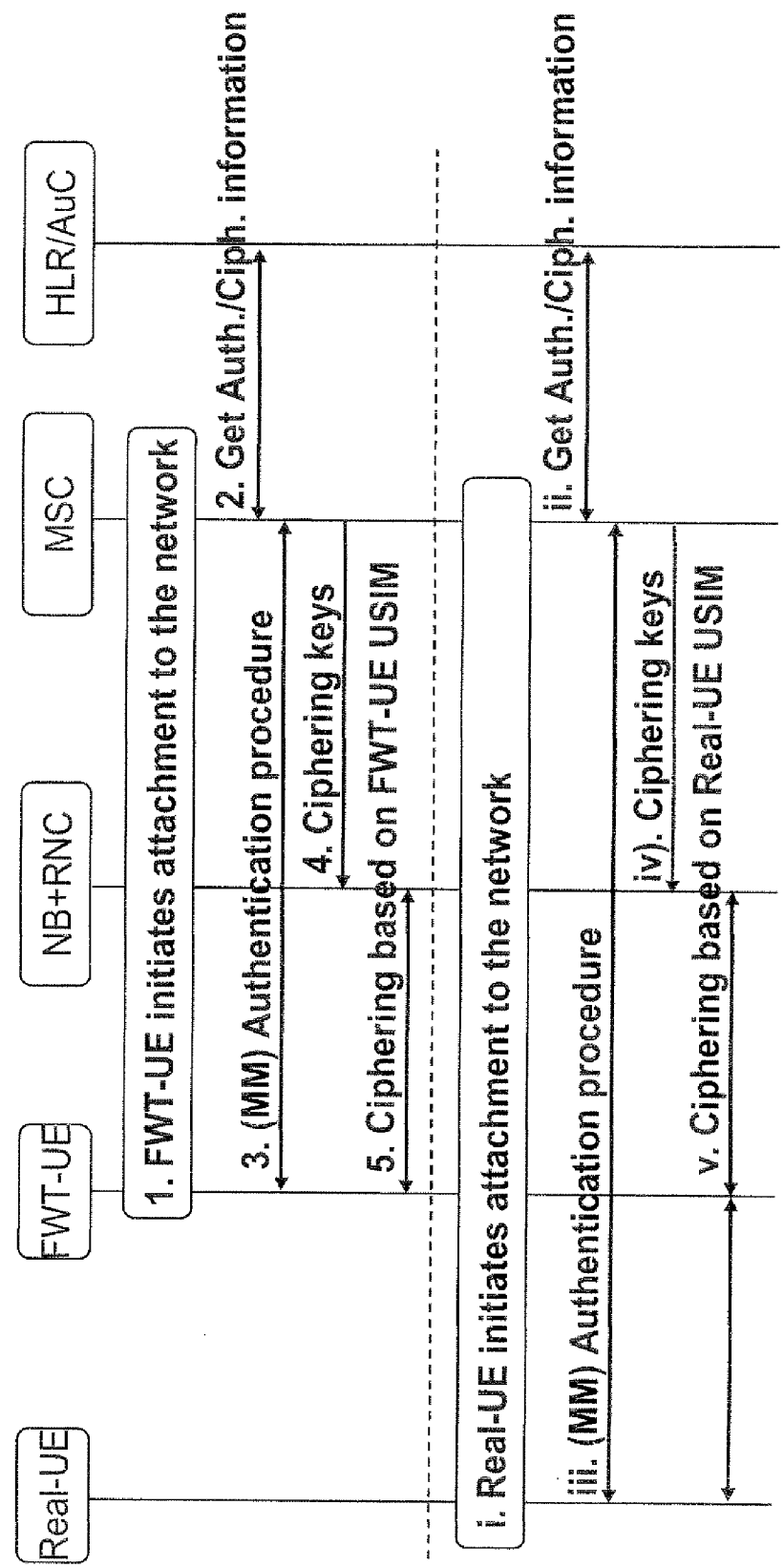
FIG. 14B is a diagrammatic view illustrating signaling involved in authentication of a mobile wireless terminal, e.g., Real-UE, and ciphering used "all the way".

FIG. 14A and FIG. 14B illustrate a first implementation of the second authentication technique. FIG. 14B particularly illustrates example acts or steps involved in the first implementation of the second authentication technique. Act 1 of FIG. 14B comprises the FWT 29 initiating attachment to the core network. Act 2 of FIG. 14B comprises the core network, e.g. a Mobile Switching Center (MSC), obtaining authorization/ciphering information for the FWT from a Home Location Register (HLR)/authentication center. Act 3 of FIG. 14B comprises performance of a Mobility Management (MM) authentication procedure, here between the network and the FWT 29. Act 4 of FIG. 14B comprises transmission of ciphering keys from the core network to the radio access network, e.g., to a radio network controller (RNC). Act 5 of FIG. 14B comprises a ciphering operation between the RNC node and the FWT 29 using, e.g., ciphering keys created as part of the authentication procedure of the FWT 29. FIG. 14B also shows, as act i that the mobile wireless terminal 30, i.e., the "real-UE, initiates attachment to the network, e.g., to a MSC node. Act ii of FIG. 14B comprises the network obtaining authorization/ciphering information from the HLR/authentication center. Act iii of FIG. 14B comprises performance of a Mobility Management (MM) authentication procedure, now between the network and the mobile wireless terminal 30. Act iv of FIG. 14B comprises transmission of ciphering keys from the core network to the radio access network, e.g., to a radio network controller (RNC). Act v of FIG. 14B comprises a ciphering operation between the mobile wireless terminal 30 and the radio access network, even though the transmission of the encrypted messages is made via the FWT.

Thus, for FIG. 14B, acts 1-5 describe how the FWT establishes connectivity towards the mobile network and normally when this happens the MWTs do not yet exist. Acts i)-v) may be performed when a MWT gets connected to the FWT and to the mobile network. The already described details of, e.g., when the FWT authenticates the MWT, are not repeated here and can be seen as being part of step i).

In the FIG. 14A and FIG. 14B example first implementation of the second authentication technique, the FWT 29: a) acts as the mobile wireless terminal towards the mobile network 22 and, in conjunction therewith b) transparently forwards authentication signalling between the mobile wireless terminal 30 and the MSC in the core network; c) when it receives encrypted content or information from the mobile network, such encrypted content or information is forwarded towards the mobile wireless terminal in an IPsec tunnel and therefore IPsec encryption is added to the encrypted content or information by the FWT 29 resulting in "double-encryption"; d) when the FWT 29 receives "double-encrypted" content or information from the mobile wireless terminal 30, it removes the IPsec encryption and then forwards the "mobile network" encrypted content towards the mobile network 22.

In the FIG. 14A and FIG. 14B implementation of the second authentication technique both the authentication signalling and ciphering principles are kept unmodified. In the implementation of FIG. 14A and FIG. 14B the traffic is encrypted between the mobile network and the "real-UE". This means also that the encrypted traffic cannot be read by the fixed wireless terminal (FWT) 29, and therefore this encrypted traffic is forwarded to the real-UE, e.g., mobile wireless terminal 30, that then performs the unciphering. However, this also means that between the fixed wireless terminal (FWT) 29 and the mobile wireless terminal 30 the traffic is encrypted twice, first using the underlying IPsec tunnel and then in addition using the mobile network encryption.

Thus, the first example implementation of the second authentication technique, authentication of the mobile wireless terminal is performed by the mobile network, and ciphering is then used between the mobile wireless terminal and the mobile network, in a manner that is transparent to the FWT device. The traffic is then encrypted twice between the FWT and the mobile wireless terminal, e.g., the Real-UE: first using the underlying IPsec tunnel between the mobile wireless terminal and the GANC-SEGW in the FWT device, and then, in addition, through the use of the mobile network encryption between the mobile wireless terminal and the mobile network.

With this first example implementation of the second authentication technique a change is needed to the GAN-protocols so that the mobile wireless terminal uses the ciphering keys for encryption after being authenticated by the mobile network. Relevant GAN specifications in 3GPP for this first example implementation of the second authentication technique include TS 43.318 and TS 44.318. Another alternative comprises enhancing the GAN-specifications so that the IPsec encryption is not applied between the mobile wireless terminal and the fixed wireless terminal and only the mobile network authentication is used between the mobile wireless terminal and the mobile network, transparently via the fixed wireless terminal.

6.2.2 Second Authentication Technique Second Example Implementation

Figure 15:
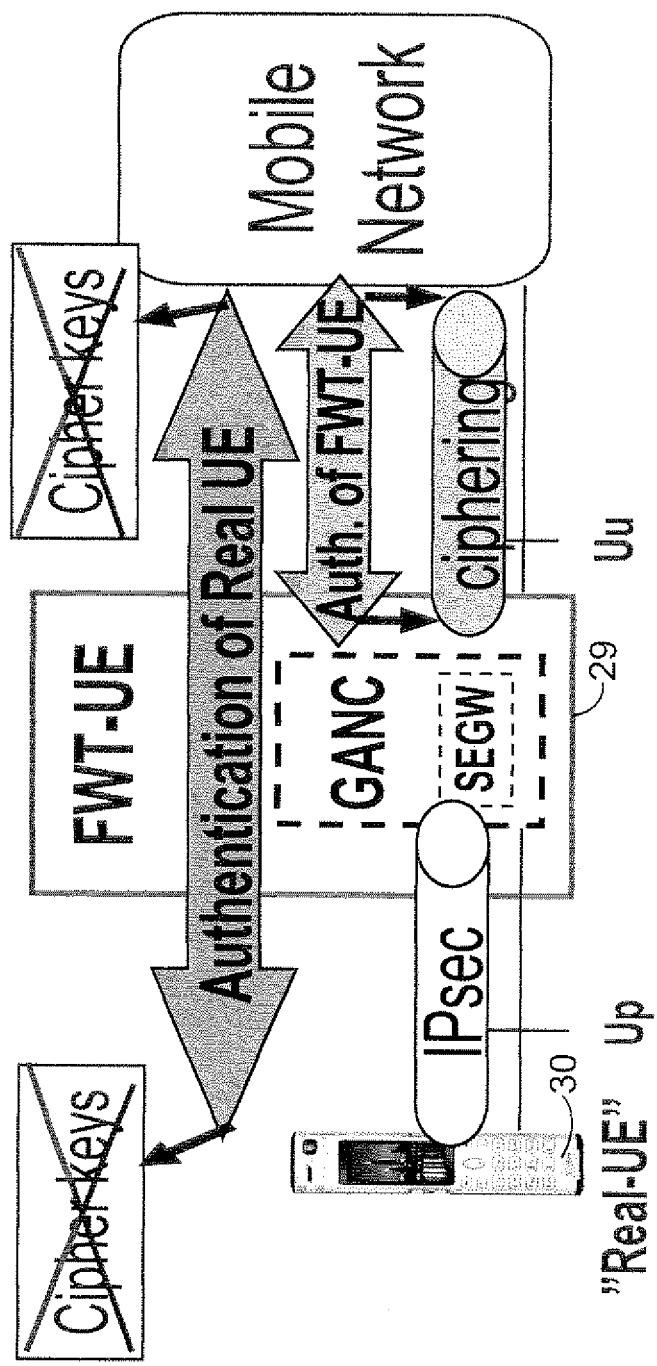
FIG. 15 is a diagrammatic view illustrating a method which employs dual authentication contexts.

FIG. 15 illustrates a second implementation of the second authentication technique. According to the second implementation of the second authentication technique the network authenticates both the mobile wireless terminal, e.g., the "Real-UE", and the FWT (e.g., the "FWT-UE") and combines authentication and ciphering contexts for the mobile wireless terminal and the FWT. The traffic over the mobile backhaul is then encrypted based on the authentication towards the FWT and the traffic between the fixed wireless terminal (FWT) and the mobile wireless terminal is encrypted once using the underlying IPsec tunnel. With this second implementation of the second authentication technique the NAS signalling is enhanced with separate authentication and ciphering contexts, but no changes are needed to the GAN protocols. A relevant NAS specification in 3GPP for the second implementation of the second authentication technique includes TS 24.008

In the FIG. 15 example second implementation of the second authentication technique, various example acts or operations are performed in or by the FWT 29 as it authenticates both the mobile wireless terminal (30) and itself. For example:

a) The FWT 29 indicates to the mobile network that the authentication of the FWT 29 and the authentication of the mobile wireless terminal "belong together", e.g., combines authentication and ciphering contexts for the mobile wireless terminal 30 and the fixed wireless terminal 29 resulting essentially in a "dual authentication context" wherein encryption between the fixed wireless terminal and the mobile network for mobile wireless terminal traffic is performed using encryption or ciphering keys created as a part of authentication of the fixed wireless terminal;

b) The FWT 29 transparently forwards the authentication signalling between the mobile wireless terminal and the Mobile Switching Center (MSC) in the core network;

c) The FWT 29 encrypts traffic between the mobile network and the FWT based on the authentication of the FWT 29. This means for example, that the FWT 29 encrypts information received from the mobile wireless terminal using the ciphering keys resulting from authentication of the FWT 29. The information is received by the FWT from the mobile wireless terminal in an IPsec tunnel between the mobile wireless terminal 30 and the fixed wireless terminal 29 and is encrypted by the MWT 30 using IPsec encryption. The FWT 29 removes the IPsec encryption from the received information prior to applying the mobile network encryption using the ciphering keys resulting from authentication of the FWT 29. The FWT 29 then forwards the encrypted information, i.e., mobile network encrypted information, towards the mobile network 22.

d) The FWT 29 encrypts traffic between the fixed wireless terminal (29) and the mobile wireless terminal (30) using the underlying IPsec tunnel. In more detail, the FWT 29 decrypts information received from the mobile network 22 using the ciphering keys resulting from authentication of the FWT 29 and forwards the decrypted information received from the mobile network in the IPsec tunnel towards the mobile wireless terminal after adding IPsec encryption to the decrypted information;

e) associating a traffic-related event, i.e., an event or activity associated with transmission of user data or user traffic, such as a call or connection, involving the mobile wireless terminal (30) to a subscription for the mobile wireless terminal (30), e.g., charges the subscription for the mobile wireless terminal (30) for the call or other traffic-related event rather than charging the fixed wireless terminal.

Thus, in the second implementation of the second authentication technique NAS signalling is enhanced with separate authentication and ciphering contexts. This may be performed so that dual authentication is performed, e.g., the network authenticates both the "Real-UE" and the "FWT-UE" and these contexts are combined. Charging and other core network (CN) functions are performed as normally towards the "Real-UE" subscription and the encryption is configured based on the authentication towards the "FWT-UE". In other words, a traffic-related event involving the mobile wireless terminal such as charging for a connection or session involving the mobile wireless terminal is assigned to or associated with a subscription for the mobile wireless terminal rather than to a subscription for the fixed wireless terminal. By doing this, the traffic may be encrypted over the mobile backhaul and the traffic between the FWT and the "Real-UE" is only encrypted once. Moreover, no changes are needed to the GAN protocols.

As understood from the foregoing, when the mobile network authenticates the MWT then there is no AAA server taking part of this procedure. The AAA server takes part in the procedure when the FWT authenticates that the MWT is allowed to establish the IPsec tunnel towards the FWT.

7.0 Machine Implementations

Figure 16:
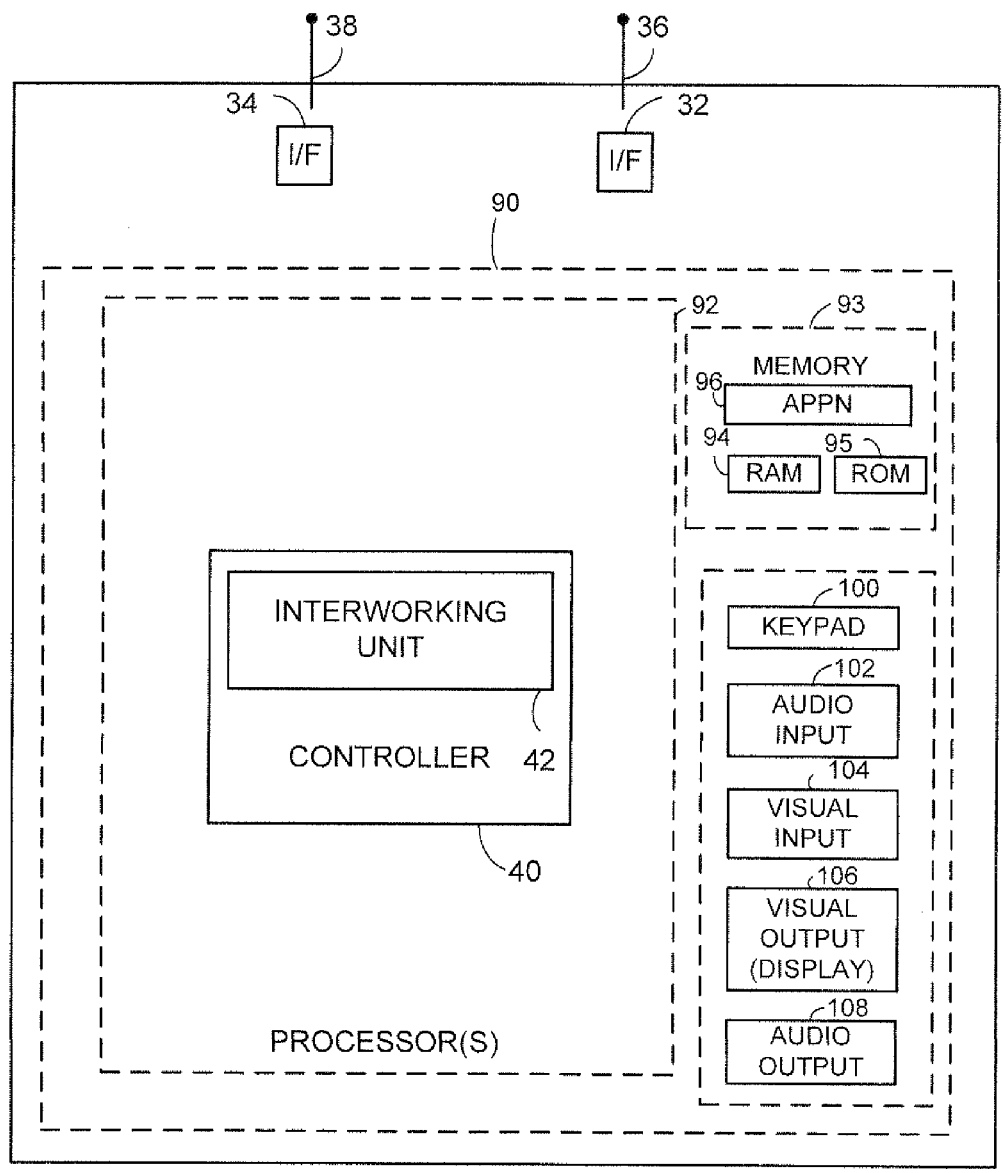
FIG. 16 is a schematic view of an example embodiment of a fixed wireless terminal comprising a platform implementation.

In example embodiments, functionalities of a fixed wireless terminal 29 may be realized using electronic circuitry. For example, FIG. 16 shows an embodiment of a fixed wireless terminal wherein the controller 40 is realized by electronic circuitry and particularly by platform 90, the platform 90 being framed by broken lines in FIG. 16. The terminology "platform" is a way of describing how the functional units of the packet core network entity can be implemented or realized by machine including electronic circuitry. One example platform 90 is a computer implementation wherein one or more of the framed elements including fixed wireless terminal 29 and its controller 40 are realized by one or more processors 92 which execute coded instructions and which use non-transitory signals in order to perform the various acts described herein. In such a computer implementation the fixed wireless terminal 29 and its controller 40 can comprise, in addition to a processor(s), memory section 93, which in turn can comprise random access memory 94; read only memory 95; application memory 96; and any other memory such as cache memory, for example. The memory section 93, e.g., the application memory 96, may store, e.g., coded instructions which can be executed by the processor to perform acts described herein.

Typically the platform 90 of fixed wireless terminal 29 also comprises other input/output units or functionalities, some of which are illustrated in FIG. 16, such as keypad 100; audio input device 102, e.g., microphone; visual input device 104, e.g., camera; visual output device 106; and audio output device 108, e.g., a speaker. Other types of input/output devices can also be connected to or comprise fixed wireless terminal (FWT) 29.

In the example of FIG. 16 the platform 90 has been illustrated as computer-implemented or computer-based platforms. Another example platform suitable for the packet core network entity in particular is that of a hardware circuit, e.g., an application specific integrated circuit (ASIC) wherein circuit elements are structured and operated to perform the various acts described herein.

Figure 17:
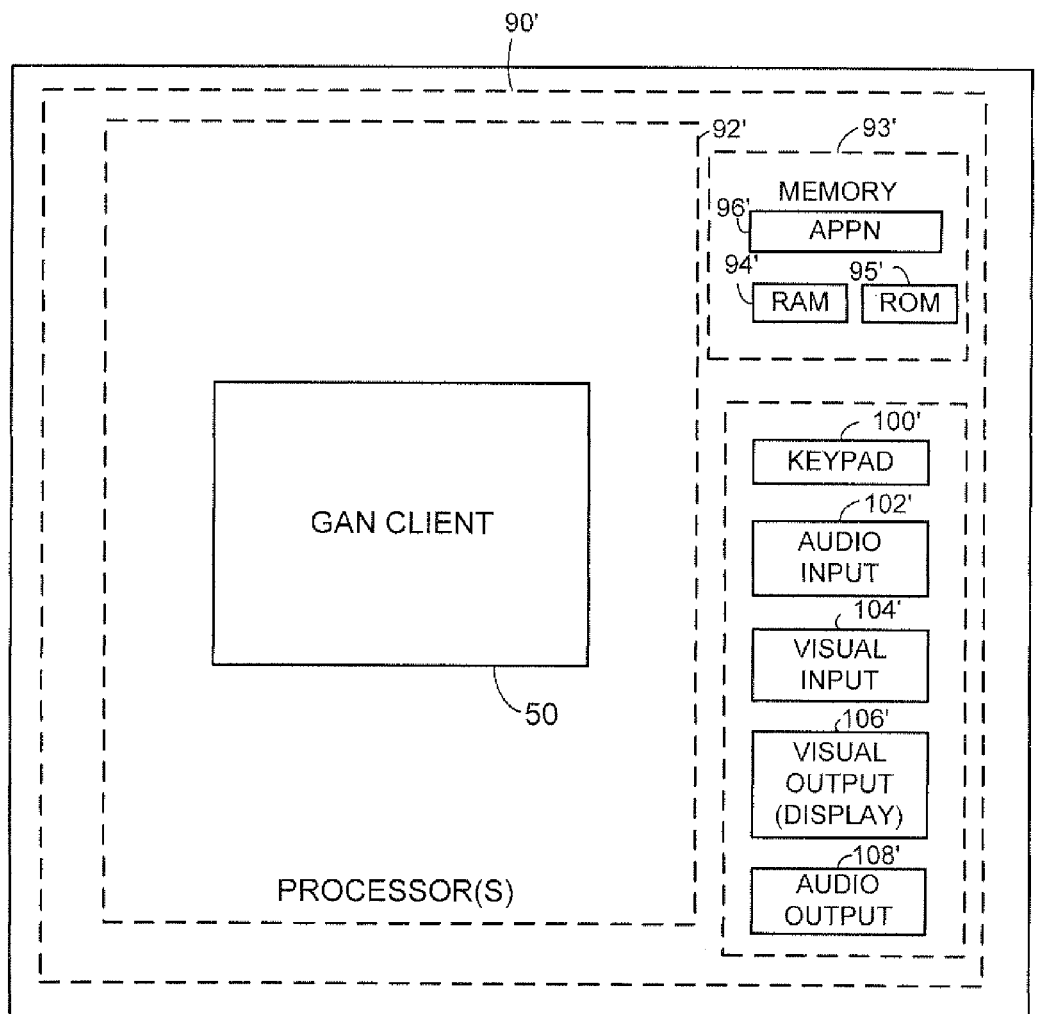
FIG. 17 is a schematic view of an example embodiment of a mobile wireless terminal comprising a platform implementation.

FIG. 17 similarly shows how mobile wireless terminal 30 with its GAN client 50 can be implemented or realized by a machine platform, e.g., by electronic circuitry in the form of a computer and/or hardware circuitry. Primed reference numerals in FIG. 17 are understood from their unprimed corresponding reference numerals in FIG. 16.

As used herein, a "mobile wireless terminal" can be a mobile station or user equipment unit (UE) such as a mobile telephone or "cellular" telephone or a laptop with wireless capability, e.g., mobile termination, and thus can be, for example, a portable, pocket, hand-held, computer-included, or car-mounted mobile device which communicates voice and/or data via a radio access network. Moreover, a wireless terminal can be a fixed terminal which communicates voice and/or data via a radio access network.

As used herein, a fixed wireless terminal comprises a wireless device which connects over a radio interface to a radio access network and remains essentially fixed during powered on operation. That is, the fixed wireless terminal remains in the same place during its powered on operation. As such, a fixed wireless terminal may have "nomadicity" in that the fixed wireless terminal may be powered off in one place, moved to another location, and then powered on again for further operation. As used herein, a fixed wireless terminal encompasses a mobile broadband router.

An AAA server is a server program that handles user requests for access to computer resources and, for an enterprise, provides authentication, authorization, and accounting (AAA) services.

The technology disclosed herein has primarily been exemplified in the context of UMTS/HSPA/WCDMA networks. However, the technology disclosed herein is not limited to any particular network or technology/generation, since the person skilled in the art realizes that the principles are applicable for other mobile systems as well, such as GSM and cdma2000. The FWT technology disclosed herein is applicable, e.g., to the market of mobile telephony.

It will be appreciated that the technology disclosed herein encompasses yet other example embodiments and modes not specifically described herein. For example, as another aspect of the technology disclosed herein authentication can be applied only towards the FWT-UE, but in such a manner that all calls, etc., would also be charged on the FWT-UE subscription. That is, both the FWT-UE call, e.g., calls made from the MWT via the FWT, and the mobile wireless terminal calls may be charged to the FWT-UE subscription. However, in another or second authentication method authentication is applied separately toward the different devices, so that the charging is assessed as actually attributed to the different devices.

As understood, e.g., from the foregoing, the technology described herein encompasses numerous examples and/or embodiments, including but not limited to examples/embodiments E1 through E46, described as follows:

Example E1

A fixed wireless terminal comprising:
a first interface (32) configured to enable radio communication with a mobile network (22);
a second interface (34) configured to enable radio communication with a mobile wireless terminal (30);
a controller (40) configured to interwork signaling according to an adaption layer protocol employed between the mobile wireless terminal (30) and the fixed wireless terminal (29) with circuit switched signaling employed between the fixed wireless terminal (29) and the mobile network (22) to provide circuit switched mobile telephony core network service to the mobile wireless terminal (30).

Example E2

The fixed wireless terminal of example E1, wherein the adaption layer protocol is a Generic Access Network (GAN) protocol.

Example E3

The fixed wireless terminal of example E2, wherein the controller (40) is configured to perform the circuit switched signaling according to a UMTS terrestrial radio access network (UTRAN) or GSM EDGE Radio Access Network (GE-RAN) protocol and to interwork the Generic Access Network (GAN) protocol and the UMTS terrestrial radio access network (UTRAN) or GSM EDGE Radio Access Network (GE-RAN) protocol.

Example E4

The fixed wireless terminal of example E2 or E3, wherein the controller (40) is configured to use system information broadcasted in the mobile network (22) to construct GAN-specific system information.

Example E5

The fixed wireless terminal of any one of examples E1 to E4, wherein the fixed wireless terminal (29) is configured:
to transparently forward authentication signalling between the mobile wireless terminal and the mobile network (22);

upon receiving mobile network encrypted information from the mobile network, adding Internet Protocol security (IPsec) encryption to the mobile network encrypted information and forwarding the mobile network and IPsec encrypted information towards the mobile wireless terminal in an IPsec tunnel;

upon receiving mobile network and IPsec encrypted information from the mobile wireless terminal, removing the IPsec encryption from the mobile network and IPsec encrypted information and forwarding the mobile network encrypted information towards the mobile network.

Example E6

The fixed wireless terminal of example E1-E4, wherein the fixed wireless terminal (29) is configured:
to indicate to the mobile network (22) that authentication of the fixed wireless terminal (29) and authentication of the mobile wireless terminal (30) are associated together and to transparently forward authentication signalling between the mobile wireless terminal (30) and the mobile network (22);
to receive information from the mobile wireless terminal (30) in an IPsec tunnel between the mobile wireless terminal (30) and the fixed wireless terminal (29);
to encrypt the information received from the mobile wireless terminal (30) using ciphering keys resulting from authentication of the fixed wireless terminal (29) and then forwarding the encrypted information towards the mobile network (22);
to decrypt information received from the mobile network (22) using the ciphering keys resulting from authentication of the fixed wireless terminal (29), and then forwarding the decrypted information towards the mobile wireless terminal (30) using the IPsec tunnel.

Example E7

The fixed wireless terminal of example E5 or E6, wherein the fixed wireless terminal (29) is configured to perform a mobile wireless terminal authentication operation in which the fixed wireless terminal (29) determines whether the mobile wireless terminal (30) is allowed to establish the Internet Protocol security (IPsec) tunnel with the fixed wireless terminal (29).

Example E8

The fixed wireless terminal of example E7, wherein the fixed wireless terminal (29) is configured to perform encryption of communications between the mobile wireless terminal (30) and the fixed wireless terminal (29) based on Internet Protocol security (IPsec) as a result of the mobile wireless terminal authentication operation.

Example E9

The fixed wireless terminal of any preceding example, wherein the fixed wireless terminal (29) is configured to create a separate packet data protocol (PDP) context or public data network (PDN) connection for use in communicating with an authentication/authorization/accounting (AAA) server (44) in the mobile network (22).

Example E10

The fixed wireless terminal of example E1-E8, wherein the fixed wireless terminal (29) is configured to indicate, as part of an attachment or PDP context or PDN connection creation, that a device type of the fixed wireless terminal (29) is fixed wireless terminal.

Example E11

The fixed wireless terminal of any preceding example, wherein the fixed wireless terminal (29) is configured to participate in a wireless terminal authentication operation, the wireless terminal authentication operation being configured:
to enable the fixed wireless terminal (29) to respond to an authentication request from a node of a core network by generating an authentication response and a ciphering key that is operative over the radio interface between the fixed wireless terminal (29) and the mobile network (22), and
to cause all transactions created by the fixed wireless terminal (29) to be charged to a subscription used for the wireless terminal authentication operation.

Example E12

The fixed wireless terminal of any preceding example, further comprising electronic circuitry operable to perform functionality of the controller (40).

Example E13

A communications system comprising:
a mobile network (22) through which a circuit switched mobile telephony core network service is provided over a radio interface;
a fixed wireless terminal (29) configured to communicate over the radio interface with the mobile network (22) and to provide the circuit switched mobile telephony core network service to a mobile wireless terminal (30).

Example E14

The communications system of example E13, wherein the fixed wireless terminal (29) comprises a controller (40) configured to interwork signaling according to an adaption layer protocol employed between the mobile wireless terminal (30) and the fixed wireless terminal (29) with circuit switched signaling employed between the fixed wireless terminal (29) and the mobile network (22).

Example E15

The communications system of example E14, wherein the adaption layer protocol is a Generic Access Network (GAN) protocol.

Example E16

A method of operating a communications system to provide circuit switched mobile telephony core network service to a mobile wireless terminal (30), the method comprising:
employing signaling according to an adaption layer protocol between the mobile wireless terminal (30) and a fixed wireless terminal (29);
using circuit switched signaling between the fixed wireless terminal (29) and a mobile network (22); and,
interworking the signaling according to the adaption layer protocol and the circuit switched signaling at the fixed wireless terminal (29).

Example E17

The method of example E16, wherein the signaling according to adaption layer protocol is Generic Access Network (GAN) signaling and wherein the method further comprises using a controller (40) for interworking the Generic Access Network (GAN) signaling and the circuit switched signaling at the fixed wireless terminal (29).

Example E18

The method of example E17, further comprising the controller (40) using system information broadcasted in the mobile network (22) to construct GAN-specific system information for use in operating the controller (40).

Example E19

The method of examples E17-E18, further comprising interworking a Generic Access Network (GAN) protocol and a UMTS terrestrial radio access network (UTRAN) or GSM EDGE Radio Access Network (GERAN) protocol.

Example E20

The method of examples E16-E19, further comprising initiating a wireless terminal authentication operation in which the fixed wireless terminal (29) creates a separate packet data protocol (PDP) context or public data network (PDN) connection for use in communicating with an authentication/authorization/accounting (AAA) server (44).

Example E21

The method of examples E16-E20, further comprising the mobile network (22) permitting a wireless terminal to make connectivity to an authentication/authorization/accounting (AAA) server (44) only if a device type of the wireless terminal is fixed wireless terminal

Example E22

The method of example E20 or E21, further comprising:
a core network maintaining a subscription for the fixed wireless terminal (29), the subscription including subscription information that indicates subscription for fixed wireless terminal;
the mobile network (22) using the subscription information for determining whether the device type of a wireless terminal seeking connectivity to the AAA server is fixed wireless terminal and permitting connectivity on the basis of the subscription information.

Example E23

The method of example E22, further comprising:
the fixed wireless terminal (29) indicating in an attachment operation or a PDP context creation operation or a PDN connection creation operation that the device type of the fixed wireless terminal (29) is fixed wireless terminal;
upon detecting that the device type indicated in the attachment operation or the PDP context creation operation or the PDN connection creation operation is fixed wireless terminal, the core network updating the subscription information for the fixed wireless terminal (29).

Example E24

The method of any of examples E20-23, further comprising the fixed wireless terminal (29) performing a mobile wireless terminal authentication operation in which the fixed wireless terminal (29) determines whether the mobile wireless terminal (30) is allowed to establish an Internet Protocol security (IPsec) connection with the fixed wireless terminal (29).

Example E25

The method of example E24, further comprising the fixed wireless terminal (29) performing encryption of communications between the mobile wireless terminal (30) and the fixed wireless terminal (29) based on Internet Protocol security (IPsec) as a result of the mobile wireless terminal authentication operation.

Example E26

The method of example E16-E25, further comprising:
the mobile wireless terminal (30) seeking an appropriate controller or gateway to enable authentication;
the appropriate controller or gateway authenticating the mobile wireless terminal (30) so that the mobile wireless terminal (30) is allowed to establish an Internet Protocol security (IPsec) connection with the appropriate controller or gateway.

Example E27

The method of example E26, further comprising providing preconfigured information to the mobile wireless terminal (30) so that the mobile wireless terminal (30) uses the preconfigured information for seeking the appropriate controller or gateway.

Example E28

The method of example E26, further comprising:
the mobile wireless terminal (30) constructing at least one fully qualified domain name to use as a query;
the mobile wireless terminal (30) using the query to obtain an address of the appropriate controller or gateway from a domain name server.

Example E29

The method of example E28, further comprising the fixed wireless terminal (29) intercepting the query and responding to the mobile wireless terminal (30) with an address of the fixed wireless terminal (29) to use as the address of the appropriate controller or gateway from the domain name server.

Example E30

The method of example E26, further comprising:
the mobile wireless terminal (30) attempting to obtain an indication of the appropriate controller or gateway from a local area network access point.

Example E31

The method of example E26, further comprising:
the mobile wireless terminal (30) attempting to use Dynamic Host Configuration Protocol (DHCP) options to obtain an indication of the appropriate controller or gateway from a local area network access point.

Example E32

The method of example E26, further comprising:
the mobile wireless terminal (30) obtaining an indication of the appropriate controller or gateway from a provisioning and/or default gateway;
the provisioning and/or default gateway redirecting the mobile wireless terminal (30) to the appropriate controller or gateway.

Example E33

The method of example E32, further comprising the provisioning and/or default gateway being agnostic whether the fixed wireless terminal (29) supports Generic Access Network Controller (GANC) functionality upon redirecting the mobile wireless terminal (30) to the fixed wireless terminal (29).

Example E34

The method of example E16-E33, further comprising:
authenticating both the mobile wireless terminal (30) and the fixed wireless terminal (29);
combining authentication and ciphering contexts for the mobile wireless terminal (30) and the fixed wireless terminal (29);
encrypting traffic between the mobile network (22) and the fixed wireless terminal (29) based on the authentication of the fixed wireless terminal (29);
encrypting traffic between the fixed wireless terminal (29) and the mobile wireless terminal (30) using an underlying IPsec tunnel;
associating a traffic-related event involving the mobile wireless terminal (30) to a subscription for the mobile wireless terminal (30).

Example E35

A method of operating a communications system comprising:
permitting a wireless terminal to make connectivity to an authentication/authorization/accounting (AAA) server (44) only if the wireless terminal is a fixed wireless terminal (29);
using the fixed wireless terminal (29) to provide circuit switched mobile telephony core network service to a mobile wireless terminal (30).

Example E36

The method of example E35, further comprising using subscription information for the wireless terminal to ascertain whether a device type of the wireless terminal is fixed wireless terminal.

Example E37

A mobile wireless terminal comprising:
an antenna which enables communication with a mobile network (22) over a wireless link;
a client configured to participate in signaling according to an adaption layer protocol with a fixed wireless terminal (29) to obtain a circuit switched mobile telephony core network service.

Example E38

The mobile wireless terminal of example E37, further comprising electronic circuitry operable to provide the client.

Example E39

The mobile wireless terminal of any of examples E37-E38, wherein the adaption layer protocol is a Generic Access Network protocol.

Example E40

The mobile wireless terminal of any of examples E37-E39, wherein the mobile wireless terminal is configured to obtain authentication with an authentication/authorization/accounting (AAA) server (44) of the mobile network (22).

Example E41

The mobile wireless terminal of example E40, wherein the mobile wireless terminal (30) is configured to encrypt information to be transmitted to the mobile network (22) via the fixed wireless terminal (29) and decrypt information received from the mobile network (22) via the fixed wireless terminal (29) using ciphering keys resulting from the authentication of the mobile wireless terminal (30) with the mobile network (22).

Example E42

The mobile wireless terminal of example E40 or E41, wherein the mobile wireless terminal (30) is further configured to perform encryption of communications between the mobile wireless terminal (30) and the fixed wireless terminal (29) based on Internet Protocol security (IPsec)

Example E43

The mobile wireless terminal of example E37-E42, wherein the mobile wireless terminal (30) is configured to seek an appropriate controller or gateway to enable authentication.

Example E44

The mobile wireless terminal of example E43, wherein the mobile wireless terminal (30) is configured to construct at least one fully qualified domain name to use in querying a domain name server to obtain an address of the appropriate controller or gateway.

Example E45

The mobile wireless terminal of example E43, wherein the mobile wireless terminal (30) is configured to obtain an indication of the appropriate controller or gateway from a local area network access point.

Example E46

The mobile wireless terminal of example E43, wherein the mobile wireless terminal (30) is configured to obtain an indication of the appropriate controller or gateway from a provisioning and/or default gateway.

Although the description above contains many specificities, these should not be construed as limiting the scope of the technology disclosed herein but as merely providing illustrations of some of the presently preferred embodiments of the disclosed technology. Thus the scope of this technology disclosed herein should be determined by the appended claims and their legal equivalents. Therefore, it will be appreciated that the scope of the technology disclosed herein fully encompasses other embodiments which may become obvious to those skilled in the art, and that the scope of the technology disclosed herein is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology disclosed herein for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A fixed wireless terminal, comprising:
   a first fixed terminal-internal interface structure configured to enable radio communication with a mobile network over a first air interface;
   a second fixed terminal-internal interface structure configured to enable radio communication with a mobile wireless terminal over a second air interface; and
   a controller configured to interwork signaling according to an adaption layer protocol employed between the mobile wireless terminal and the fixed wireless terminal over the second air interface with circuit switched signaling employed between the fixed wireless terminal and the mobile network over the first air interface to provide circuit switched mobile telephony core network service to the mobile wireless terminal,
   wherein the fixed wireless terminal is configured
      to transparently forward authentication signalling between the mobile wireless terminal and the mobile network,
      upon receiving mobile network encrypted information from the mobile network, adding Internet Protocol security (IPsec) encryption to the mobile network encrypted information and forwarding the mobile network and IPsec encrypted information towards the mobile wireless terminal in an IPsec tunnel, and
      upon receiving mobile network and IPsec encrypted information from the mobile wireless terminal, removing the IPsec encryption from the mobile network and IPsec encrypted information and forwarding the mobile network encrypted information towards the mobile network.

2. The fixed wireless terminal of claim 1, wherein the adaption layer protocol is a Generic Access Network (GAN) protocol.

3. The fixed wireless terminal of claim 2, wherein the controller is configured to perform the circuit switched signaling according to a UMTS terrestrial radio access network (UTRAN) or GSM EDGE Radio Access Network (GERAN) protocol and to interwork the Generic Access Network (GAN) protocol and the UMTS terrestrial radio access network (UTRAN) or GSM EDGE Radio Access Network (GERAN) protocol.

4. The fixed wireless terminal of claim 2, wherein the controller is configured to use system information broadcasted in the mobile network to construct GAN-specific system information.

5. The fixed wireless terminal of claim 1, wherein the fixed wireless terminal is configured:
   to indicate to the mobile network that authentication of the fixed wireless terminal and authentication of the mobile wireless terminal are associated together and to transparently forward authentication signalling between the mobile wireless terminal and the mobile network;
   to receive information from the mobile wireless terminal in an IPsec tunnel between the mobile wireless terminal and the fixed wireless terminal;
   to encrypt the information received from the mobile wireless terminal using ciphering keys resulting from authentication of the fixed wireless terminal and then forwarding the encrypted information towards the mobile network; and
   to decrypt information received from the mobile network using the ciphering keys resulting from authentication of the fixed wireless terminal, and then forwarding the decrypted information towards the mobile wireless terminal using the IPsec tunnel.

6. The fixed wireless terminal of claim 1, wherein the fixed wireless terminal is configured to perform a mobile wireless terminal authentication operation in which the fixed wireless terminal determines whether the mobile wireless terminal is allowed to establish an Internet Protocol security (IPsec) connection with the fixed wireless terminal.

7. The fixed wireless terminal of claim 6, wherein the fixed wireless terminal is configured to perform encryption of communications between the mobile wireless terminal and the fixed wireless terminal based on Internet Protocol security (IPsec) as a result of the mobile wireless terminal authentication operation.

8. The fixed wireless terminal of claim 1, wherein the fixed wireless terminal is configured to create a separate packet data protocol (PDP) context or public data network (PDN) connection for use in communicating with an authentication/authorization/accounting (AAA) server in the mobile network.

9. The fixed wireless terminal of claim 1, wherein the fixed wireless terminal is configured to indicate, as part of an attachment or PDP context or PDN connection creation, that a device type of the fixed wireless terminal is fixed wireless terminal.

10. The fixed wireless terminal of claim 1, wherein the fixed wireless terminal is configured to participate in a wireless terminal authentication operation, the wireless terminal authentication operation being configured:
    to enable the fixed wireless terminal to respond to an authentication request from a node of a core network by generating an authentication response and a ciphering key that is operative over the radio interface between the fixed wireless terminal and the mobile network, and
    to cause all transactions created by the fixed wireless terminal to be charged to a subscription used for the wireless terminal authentication operation.

11. The fixed wireless terminal of claim 1, further comprising electronic circuitry operable to perform functionality of the controller.

12. The fixed wireless terminal of claim 1, wherein the first air interface is a Uu interface and the second air interface is a Up interface.

13. A communications system, comprising:
a fixed wireless terminal comprising:
a first fixed terminal-internal interface structure configured to enable radio communication with a mobile network over a first air interface;
a second fixed terminal-internal interface structure configured to enable radio communication with a mobile wireless terminal over a second air interface; and
a controller configured to interwork signaling according to an adaption layer protocol employed between the mobile wireless terminal and the fixed wireless terminal over the second air interface with circuit switched signaling employed between the fixed wireless terminal and the mobile network over the first air interface to provide circuit switched mobile telephony core network service to the mobile wireless terminal; and
the mobile network through which the circuit switched mobile telephony core network service is provided over the first air interface,
wherein the fixed wireless terminal is configured
to transparently forward authentication signalling between the mobile wireless terminal and the mobile network,
upon receiving mobile network encrypted information from the mobile network, adding Internet Protocol security (IPsec) encryption to the mobile network encrypted information and forwarding the mobile network and IPsec encrypted information towards the mobile wireless terminal in an IPsec tunnel, and
upon receiving mobile network and IPsec encrypted information from the mobile wireless terminal, removing the IPsec encryption from the mobile network and IPsec encrypted information and forwarding the mobile network encrypted information towards the mobile network.

14. The communications system of claim 13, wherein the fixed wireless terminal comprises a controller configured to interwork signaling according to the adaption layer protocol employed between the mobile wireless terminal and the fixed wireless terminal with circuit switched signaling employed between the fixed wireless terminal and the mobile network.

15. The communications system of claim 14, wherein the adaption layer protocol is a Generic Access Network (GAN) protocol.

16. The communications system of claim 13, wherein the first air interface is a Uu interface and the second air interface is a Up interface.

17. A method of operating a communications system to provide circuit switched mobile telephony core network service to a mobile wireless terminal, the method comprising:
employing signaling according to an adaption layer protocol between the mobile wireless terminal and a fixed wireless terminal over a first air interface;
using circuit switched signaling between the fixed wireless terminal and a mobile network over a second air interface;
interworking the signaling according to the adaption layer protocol and the circuit switched signaling at the fixed wireless terminal;
the fixed wireless terminal transparently forwarding authentication signalling between the mobile wireless terminal and the mobile network;
upon receiving mobile network encrypted information from the mobile network, the fixed wireless terminal adding Internet Protocol security (IPsec) encryption to the mobile network encrypted information and forwarding the mobile network and IPsec encrypted information towards the mobile wireless terminal in an IPsec tunnel; and
upon receiving mobile network and IPsec encrypted information from the mobile wireless terminal, the fixed wireless terminal removing the IPsec encryption from the mobile network and IPsec encrypted information and forwarding the mobile network encrypted information towards the mobile network.

18. The method of claim 17, further comprising initiating a wireless terminal authentication operation in which the fixed wireless terminal creates a separate packet data protocol (PDP) context or public data network (PDN) connection for use in communicating with an authentication/authorization/accounting (AAA) server.

19. The method of claim 18, further comprising:
a core network maintaining a subscription for the fixed wireless terminal, the subscription including subscription information that indicates the subscription for the fixed wireless terminal; and
the mobile network using the subscription information for determining whether the device type of a wireless terminal seeking connectivity to the AAA server is the fixed wireless terminal and permitting connectivity on the basis of the subscription information.

20. The method of claim 17, further comprising the mobile network permitting a wireless terminal to make connectivity to an authentication/authorization/accounting (AAA) server only if a device type of the wireless terminal is fixed wireless terminal.

21. The method of claim 20, further comprising:
the fixed wireless terminal indicating in an attachment operation or a PDP context creation operation or a PDN connection creation operation that the device type of the fixed wireless terminal is fixed wireless terminal;
upon detecting the device type indicated in the attachment operation or the PDP context creation operation or the PDN connection creation operation, a core network updating a subscription for the fixed wireless terminal to include subscription information that designates the device type of the fixed wireless terminal to be fixed wireless terminal; and
the mobile network using the subscription information for determining whether a wireless terminal seeking connectivity to the AAA server is the fixed wireless terminal and permitting connectivity on the basis of the subscription information.

22. The method of claim 17, further comprising:
authenticating both the mobile wireless terminal and the fixed wireless terminal;
combining authentication and ciphering contexts for the mobile wireless terminal and the fixed wireless terminal;
encrypting traffic between the mobile network and the fixed wireless terminal based on the authentication of the fixed wireless terminal;
encrypting traffic between the fixed wireless terminal and the mobile wireless terminal using an underlying IPsec tunnel; and
associating a traffic-related event involving the mobile wireless terminal to a subscription for the mobile wireless terminal.

23. The method of claim 17, wherein the first air interface is a Uu interface and the second air interface is a Up interface.

24. A method of operating a communications system, the method comprising:

permitting a wireless terminal to make connectivity to an authentication/authorization/accounting (AAA) server only if the wireless terminal is a fixed wireless terminal which is connected through a first wireless interface to the authentication/authorization/accounting (AAA) server; and using the fixed wireless terminal to provide circuit switched mobile telephony core network service over a second wireless interface to a mobile wireless terminal, wherein using the fixed wireless terminal to provide the circuit switched mobile telephony core network service to the mobile wireless terminal comprises:

the fixed wireless terminal transparently forwarding authentication signalling between the mobile wireless terminal and a mobile network of the communications system;

upon receiving mobile network encrypted information from the mobile network, the fixed wireless terminal adding Internet Protocol security (IPsec) encryption to the mobile network encrypted information and forwarding the mobile network and IPsec encrypted information towards the mobile wireless terminal in an IPsec tunnel; and upon receiving mobile network and IPsec encrypted information from the mobile wireless terminal, the fixed wireless terminal removing the IPsec encryption from the mobile network and IPsec encrypted information and forwarding the mobile network encrypted information towards the mobile network.

25. The method of claim 24, further comprising using subscription information for the wireless terminal to ascertain whether a device type of the wireless terminal is the fixed wireless terminal.

26. A mobile wireless terminal, comprising:

an antenna which enables communication with a fixed wireless terminal over an air interface; and a client configured to participate in signaling according to an adaption layer protocol with the fixed wireless terminal over the air interface to obtain a circuit switched mobile telephony core network service which the fixed wireless terminal receives through another air interface, wherein the client is configured to transmit authentication signaling to a mobile network via the fixed wireless terminal, encrypt information to be transmitted to the mobile network via, add Internet Protocol security (IPsec) encryption to the mobile network encrypted information, and transmit the mobile network and IPsec encrypted information towards the fixed wireless terminal in an IPsec tunnel, and receive mobile network and IP sec encrypted information from the fixed wireless terminal in the IPsec tunnel.

27. The mobile wireless terminal of claim 26, further comprising electronic circuitry operable to provide the client.

28. The mobile wireless terminal of claim 26, wherein the adaption layer protocol is a Generic Access Network protocol.

29. The mobile wireless terminal of claim 26, wherein the mobile wireless terminal is configured to obtain authentication with an authentication/authorization/accounting (AAA) server of the mobile network.

30. The mobile wireless terminal of claim 29, wherein the mobile wireless terminal is configured to encrypt information to be transmitted to the mobile network via the fixed wireless terminal and decrypt information received from the mobile network via the fixed wireless terminal using ciphering keys resulting from the authentication of the mobile wireless terminal with the mobile network.

31. The mobile wireless terminal of claim 29, wherein the mobile wireless terminal is further configured to perform encryption of communications between the mobile wireless terminal and the fixed wireless terminal based on Internet Protocol security (IPsec).

32. The mobile wireless terminal of claim 26, wherein the mobile wireless terminal is configured to seek an appropriate controller or gateway to enable authentication.

33. The mobile wireless terminal of claim 32, wherein the mobile wireless terminal is configured to construct at least one fully qualified domain name to use in querying a domain name server to obtain an address of the appropriate controller or gateway.

34. The mobile wireless terminal of claim 32, wherein the mobile wireless terminal is configured to obtain an indication of the appropriate controller or gateway from a local area network access point.

35. The mobile wireless terminal of claim 32, wherein the mobile wireless terminal is configured to obtain an indication of the appropriate controller or gateway from a provisioning and/or default gateway.

36. The mobile wireless terminal of claim 26, wherein the air interface and the another air interface is a Up interface.

37. A fixed wireless terminal, comprising:

a first fixed terminal-internal interface structure configured to enable radio communication with a mobile network over a first air interface;

a second fixed terminal-internal interface structure configured to enable radio communication with a mobile wireless terminal over a second air interface; and a controller configured to interwork signaling according to an adaption layer protocol employed between the mobile wireless terminal and the fixed wireless terminal over the second air interface with circuit switched signaling employed between the fixed wireless terminal and the mobile network over the first air interface to provide circuit switched mobile telephony core network service to the mobile wireless terminal, wherein the fixed wireless terminal is configured to indicate to the mobile network that authentication of the fixed wireless terminal and authentication of the mobile wireless terminal are associated together and to transparently forward authentication signalling between the mobile wireless terminal and the mobile network, to receive information from the mobile wireless terminal in an IPsec tunnel between the mobile wireless terminal and the fixed wireless terminal, to encrypt the information received from the mobile wireless terminal using ciphering keys resulting from authentication of the fixed wireless terminal and then forwarding the encrypted information towards the mobile network, and to decrypt information received from the mobile network using the ciphering keys resulting from authentication of the fixed wireless terminal, and then forwarding the decrypted information towards the mobile wireless terminal using the IPsec tunnel.

38. A communications system, comprising:

a fixed wireless terminal comprising:

a first fixed terminal-internal interface structure configured to enable radio communication with a mobile network over a first air interface;

a second fixed terminal-internal interface structure configured to enable radio communication with a mobile wireless terminal over a second air interface; and a controller configured to interwork signaling according to an adaption layer protocol employed between the mobile wireless terminal and the fixed wireless terminal over the second air interface with circuit switched signaling employed between the fixed wireless terminal and the mobile network over the first air interface to provide circuit switched mobile telephony core network service to the mobile wireless terminal; and the mobile network through which the circuit switched mobile telephony core network service is provided over the first air interface, wherein the fixed wireless terminal is configured to indicate to the mobile network that authentication of the fixed wireless terminal and authentication of the mobile wireless terminal are associated together and to transparently forward authentication signalling between the mobile wireless terminal and the mobile network, to receive information from the mobile wireless terminal in an IPsec tunnel between the mobile wireless terminal and the fixed wireless terminal, to encrypt the information received from the mobile wireless terminal using ciphering keys resulting from authentication of the fixed wireless terminal and then forwarding the encrypted information towards the mobile network, and to decrypt information received from the mobile network using the ciphering keys resulting from authentication of the fixed wireless terminal, and then forwarding the decrypted information towards the mobile wireless terminal using the IPsec tunnel.

39. A method of operating a communications system to provide circuit switched mobile telephony core network service to a mobile wireless terminal, the method comprising:

employing signaling according to an adaption layer protocol between the mobile wireless terminal and a fixed wireless terminal over a first air interface;

using circuit switched signaling between the fixed wireless terminal and a mobile network over a second air interface;

interworking the signaling according to the adaption layer protocol and the circuit switched signaling at the fixed wireless terminal;

the fixed wireless terminal indicating to the mobile network that authentication of the fixed wireless terminal and authentication of the mobile wireless terminal are associated together and transparently forwarding authentication signalling between the mobile wireless terminal and the mobile network;

the fixed wireless terminal receiving information from the mobile wireless terminal in an IPsec tunnel between the mobile wireless terminal and the fixed wireless terminal;

the fixed wireless terminal encrypting the information received from the mobile wireless terminal using ciphering keys resulting from authentication of the fixed wireless terminal and then forwarding the encrypted information towards the mobile network; and the fixed wireless terminal decrypting information received from the mobile network using the ciphering keys resulting from authentication of the fixed wireless terminal, and then forwarding the decrypted information towards the mobile wireless terminal using the IPsec tunnel.

40. A method of operating a communications system, the method comprising:

permitting a wireless terminal to make connectivity to an authentication/authorization/accounting (AAA) server only if the wireless terminal is a fixed wireless terminal which is connected through a first wireless interface to the authentication/authorization/accounting (AAA) server; and using the fixed wireless terminal to provide circuit switched mobile telephony core network service over a second wireless interface to a mobile wireless terminal, wherein using the fixed wireless terminal to provide the circuit switched mobile telephony core network service to the mobile wireless terminal comprises:

the fixed wireless terminal indicating to a mobile network of the communications system that authentication of the fixed wireless terminal and authentication of the mobile wireless terminal are associated together and transparently forwarding authentication signalling between the mobile wireless terminal and the mobile network;

the fixed wireless terminal receiving information from the mobile wireless terminal in an IPsec tunnel between the mobile wireless terminal and the fixed wireless terminal;

the fixed wireless terminal encrypting the information received from the mobile wireless terminal using ciphering keys resulting from authentication of the fixed wireless terminal and then forwarding the encrypted information towards the mobile network; and the fixed wireless terminal decrypting information received from the mobile network using the ciphering keys resulting from authentication of the fixed wireless terminal, and then forwarding the decrypted information towards the mobile wireless terminal using the IPsec tunnel.

* * * * *